United States Patent
Arad et al.

(10) Patent No.: US 8,918,108 B2
(45) Date of Patent: Dec. 23, 2014

(54) METHODS AND SYSTEMS FOR FREQUENCY REUSE IN MULTI-CELL DEPLOYMENT MODEL OF A WIRELESS BACKHAUL NETWORK

(75) Inventors: Seyed M. Arad, Richmond Hill (CA); Frank van Heeswyk, Toronto (CA)

(73) Assignee: Taqua WBH, LLC, Richardson, TX (US)

( * ) Notice: Subject to any disclaimer, the term of this patent is extended or adjusted under 35 U.S.C. 154(b) by 189 days.

(21) Appl. No.: 13/427,472

(22) Filed: Mar. 22, 2012

(65) Prior Publication Data
US 2013/0029674 A1    Jan. 31, 2013

Related U.S. Application Data

(63) Continuation-in-part of application No. 12/950,006, filed on Nov. 19, 2010, now Pat. No. 8,326,307.

(51) Int. Cl.
*H04W 40/00* (2009.01)
*H04W 16/02* (2009.01)

(52) U.S. Cl.
CPC ..................... *H04W 16/02* (2013.01)
USPC ........... 455/446; 455/447; 455/448; 455/449; 455/450; 455/63.1; 455/63.2; 455/63.4

(58) Field of Classification Search
USPC .............. 455/457, 63.1, 63.2, 63.4, 447, 448, 455/449, 446
See application file for complete search history.

(56) References Cited

U.S. PATENT DOCUMENTS

| | | | |
|---|---|---|---|
| 6,600,921 B1 * | 7/2003 | Pietrusiak | 455/429 |
| 7,689,228 B2 | 3/2010 | Labedz | |
| 2002/0072373 A1 * | 6/2002 | Muramoto et al. | 455/446 |
| 2002/0159405 A1 | 10/2002 | Garrison et al. | |
| 2003/0050067 A1 | 3/2003 | Rozmaryn | |
| 2004/0063433 A1 * | 4/2004 | Garrison | 455/447 |
| 2005/0245265 A1 | 11/2005 | Nascimbene et al. | |
| 2008/0232320 A1 * | 9/2008 | Lee et al. | 370/329 |
| 2008/0248803 A1 * | 10/2008 | Lee et al. | 455/450 |
| 2009/0197588 A1 | 8/2009 | Khandekar et al. | |
| 2010/0265913 A1 | 10/2010 | Gorokhov et al. | |

OTHER PUBLICATIONS

International Search Report and Written Opinion issued for PCT/US2012/060335, dated Apr. 1, 2013, 11 pages.
International Search Report and Written Opinion issued for PCT/US2011/061500, dated May 10, 2012, 10 pages.

* cited by examiner

*Primary Examiner* — Khalid Shaheed
(74) *Attorney, Agent, or Firm* — Fulbright & Jaworski LLP

(57) ABSTRACT

Systems and methods for frequency reuse in a multi-cell deployment model of a wireless backhaul network are shown. According to embodiments, a wireless backhaul network includes a plurality of cells, each of which includes one or more hubs supporting wireless backhaul communication utilizing a cell deployment geometry and wireless communication frequency assignments adapted to facilitate heterogeneous cell configurations within the wireless backhaul network. In particular, embodiments provide frequency planning for initial deployment, build out, and expansion of a plurality of cells providing wireless backhaul communication so as to implement a predetermined wireless frequency reuse pattern providing alternating utilization of a plurality of wireless communication frequencies by the cells of the backhaul network.

28 Claims, 12 Drawing Sheets

METHODS AND SYSTEMS FOR FREQUENCY REUSE IN MULTI-CELL DEPLOYMENT MODEL OF A WIRELESS BACKHAUL NETWORK

CROSS-REFERENCE TO RELATED APPLICATIONS

The present application is a continuation-in-part of co-pending, commonly assigned, patent application Ser. No. 12/950,006 entitled "METHOD AND SYSTEM FOR FREQUENCY REUSE IN MULTI-CELL DEPLOYMENT MODEL OF A WIRELESS BACKHAUL NETWORK," filed Nov. 19, 2010, the disclosure of which is hereby incorporated herein by reference.

TECHNICAL FIELD

The present invention relates to implementation of a communication network, and more specifically to frequency reuse in wireless backhaul networks.

BACKGROUND OF THE INVENTION

Communication between nodes in a communication network requires the connection of end customers to their respective telecommunication providers. In that manner, end customers are able to communicate with each other no matter which provider is used by a respective customer. Communication between customers is implemented through a telecommunications infrastructure (e.g., wireless core network for packet and circuit switch voice or data) supporting each of the providers. A typical problem facing telecommunication providers is connecting the end customer to the telecommunications infrastructure.

A backhaul network connects remote nodes back to their respective hubs to effect communication between the remote nodes and respective telecommunication providers. Remote nodes facilitate communication with end customers (e.g., mobile units, fixed units, etc.), such as within small cells (e.g., picocells). For greater scalability and a more economical solution, this connection can be configured over a wireless connection, as opposed to a more typical wired connection. For instance, as the number of users, or as demand for bandwidth grows, throughout a geographic area, more hubs and remote nodes can be added to service the increase in demand. As a result, a particular geographic area may be supported by multiple hubs, each of which supports multiple remotes.

However, as the network of hubs and remotes grow within a geographic area (e.g., through the addition of hubs and remotes to a region to support traffic growth), wireless communication between the hubs and remote nodes may experience problems atypical of a wired backhaul network. For instance, communication between remotes and hubs may interfere with each other, thereby, in part, reducing overall data throughput rates, increasing outage areas within the geographic footprint of the network, and increasing non-uniformity of signal coverage and throughput throughout a geographic area. Accordingly, although the densification of the network will allow more traffic to be supported, such densification can increase self interference within the backhaul network unless there is proper planning.

BRIEF SUMMARY OF THE INVENTION

The present invention relates to systems and methods for frequency reuse in a multi-cell deployment model of a wireless backhaul network. According to embodiments of the invention, a wireless backhaul network includes a plurality of cells, each of which includes one or more hubs supporting wireless backhaul communication utilizing a cell deployment geometry and wireless communication frequency assignments adapted to facilitate heterogeneous cell configurations within the wireless backhaul network. In particular, embodiments provide frequency planning for initial deployment, build out, and expansion of a plurality of cells providing wireless backhaul communication so as to implement a predetermined wireless frequency reuse pattern providing alternating utilization of a plurality of wireless communication frequencies by the cells of the backhaul network.

Frequency reuse patterns provided according to embodiments are adapted to accommodate heterogeneous deployment and expansion in the wireless backhaul network by dividing each cell of a selected cluster of cells to provide added sectors. Frequency assignments are made according to embodiments such that adjacent cells provide orthogonal frequency faces with respect to one another. The term "orthogonal frequency face" as used herein means a cell edge of a cell associated with a frequency of the plurality of wireless communication frequencies which is adjacent to a cell edge of another cell associated with a different frequency of the plurality of wireless communication frequencies to thereby mitigate mutual interference. The frequency assignments are further made according to embodiments such that, where orthogonal frequency faces are not maintained between adjacent cell edges as sectors are added, non-broadside common frequency views are provided with respect to the particular opposing sectors for which orthogonal frequency faces are not provided. Such non-broadside common frequency views comprise the azimuthal direction of the opposing sectors being offset, such as by 20° or more, to thereby mitigate mutual interference. Accordingly, the foregoing frequency reuse patterns are adapted to accommodate heterogeneous expansion in the wireless backhaul network by dividing each cell of a selected cluster of cells to provide added sectors while mitigating interference by maintaining the orthogonal frequency face relationships and/or providing non-broadside common frequency views between opposing sectors in the wireless backhaul network.

Using such network expansion frequency reuse adaptation techniques, cells of a wireless backhaul network may be initially deployed in a lower capacity configuration and selected portions of the wireless backhaul network expanded (e.g., to provide increased capacity and/or more frequency robust configuration) as need or desire dictates. For example, a cluster of cells (e.g., cells serving an area of increased communication traffic, with additional subscriber deployments, etc.) previously deployed as omni-directional cells each utilizing a single wireless communication frequency within their respective cell service area may each be divided into a plurality of geographic sectors (e.g., two, four, etc.) to thereby utilize a plurality of wireless communication frequencies within their respective cell service areas. Similarly, a cluster of cells previously deployed as multi-sectored cells (e.g., two sectors, four sectors, etc) each utilizing a plurality of wireless communication frequencies within their respective cell service area may each be divided into still more geographic sectors (e.g., four sectors, eight sectors, etc.). The orthogonal frequency face relationship between each cluster cell and corresponding cell external to the cluster is maintained as the cells of the cluster are expanded using the network expansion frequency reuse adaptation techniques in accordance with embodiments of the invention.

Frequency reuse patterns utilized according to embodiments of the invention for providing network expansion frequency reuse adaptation techniques may be used in various combinations, such as to provide increased capacity and/or frequency robust configurations. For example, a second frequency reuse pattern herein may be overlaid, or partially overlaid, over a first frequency reuse pattern for assigning additional wireless communication frequencies to hubs in a manner adapted to accommodate expansion in the wireless backhaul network.

Embodiments of the invention preferably implement frequency reuse patterns which are adapted to provide the aforementioned orthogonal frequency faces with respect to cells of the network. For example, a frequency reuse pattern including cell frequency assignment layouts which differ from cell to cell within the wireless backhaul network, although providing alternating utilization of a plurality of wireless communication frequencies by the cells, may be used according to embodiments of the invention. In one embodiment of the present invention, a backhaul network includes a plurality of cells, each of which includes one or more hubs supporting wireless backhaul communication over four geographic sectors. A first tier of the plurality of cells includes a center cell configured to support a first alternating frequency reuse pattern of a first channel and a second channel over four corresponding geographic sectors. A second tier of the plurality of cells surrounds the first tier. The second tier includes a first cell configured to support the first alternating reuse pattern over four corresponding geographic sectors, and wherein the first cell is horizontally adjacent to the center cell. The second tier also includes a second cell configured to support a second alternating reuse pattern over four corresponding geographic sectors, wherein the second alternating frequency reuse pattern includes the first alternating frequency reuse pattern rotated by ninety degrees. The second cell is vertically adjacent to the center cell, and offset the center cell by half an edge.

In another embodiment, a wireless backhaul network includes a first cell configured to support a first alternating frequency reuse pattern of a first channel and a second channel over four corresponding geographic sectors. The four corresponding geographic sectors are represented by a square pattern. In addition, the network includes a second cell configured to support a second alternating reuse pattern over four corresponding geographic sectors. The second alternating frequency reuse pattern comprises the first alternating frequency reuse pattern, that is rotated by ninety degrees. In addition, the second cell is vertically adjacent to the center cell. Also, the second cell is offset from the center cell by half an edge.

In still another embodiment, a backhaul network includes a plurality of cells, each of which includes one or more hubs supporting wireless backhaul communication over four geographic sectors. The network includes a first row of the plurality of cells. More specifically, the first row includes a plurality of first cells, each of which is configured to support a first alternating frequency reuse pattern of a first channel and a second channel over four corresponding geographic sectors. In the first row, edges of two adjacent first cells are aligned without any offset. In addition, the network includes a second row of the plurality of cells. More specifically, the second row includes a plurality of second cells, each of which is configured to support a second alternating reuse pattern over four corresponding geographic sectors. In the second row, edges of two adjacent second cells are aligned without any offset. Also, the second alternating frequency reuse pattern comprises the first alternating frequency reuse pattern that is rotated by ninety degrees. Moreover, the second row is adjacent to the first row, such that a corresponding second cell in the second row is adjacent to a corresponding first cell in the first row with an offset of half an edge of the first cell.

In another embodiment, a method for configuring a backhaul network is disclosed. The method includes defining two types of cell configurations. A first cell is defined that is configured to support a first alternating frequency reuse pattern utilizing a first channel and a second channel over four corresponding geographic sectors. The first cell comprises one or more hubs supporting wireless backhaul communication over four geographic sectors. In addition, a second cell is defined that is configured to support a second alternating frequency reuse pattern over four corresponding geographic sectors, wherein the second alternating frequency reuse pattern comprises the first alternating frequency reuse pattern that is rotated by ninety degrees. In addition, the second cell includes one or more hubs supporting wireless backhaul communication over four geographic sectors. A first cell is deployed. A second cell is also deployed, wherein the second cell is vertically adjacent to the first cell, and offset the first cell by half an edge.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE INVENTION

Figure 1:
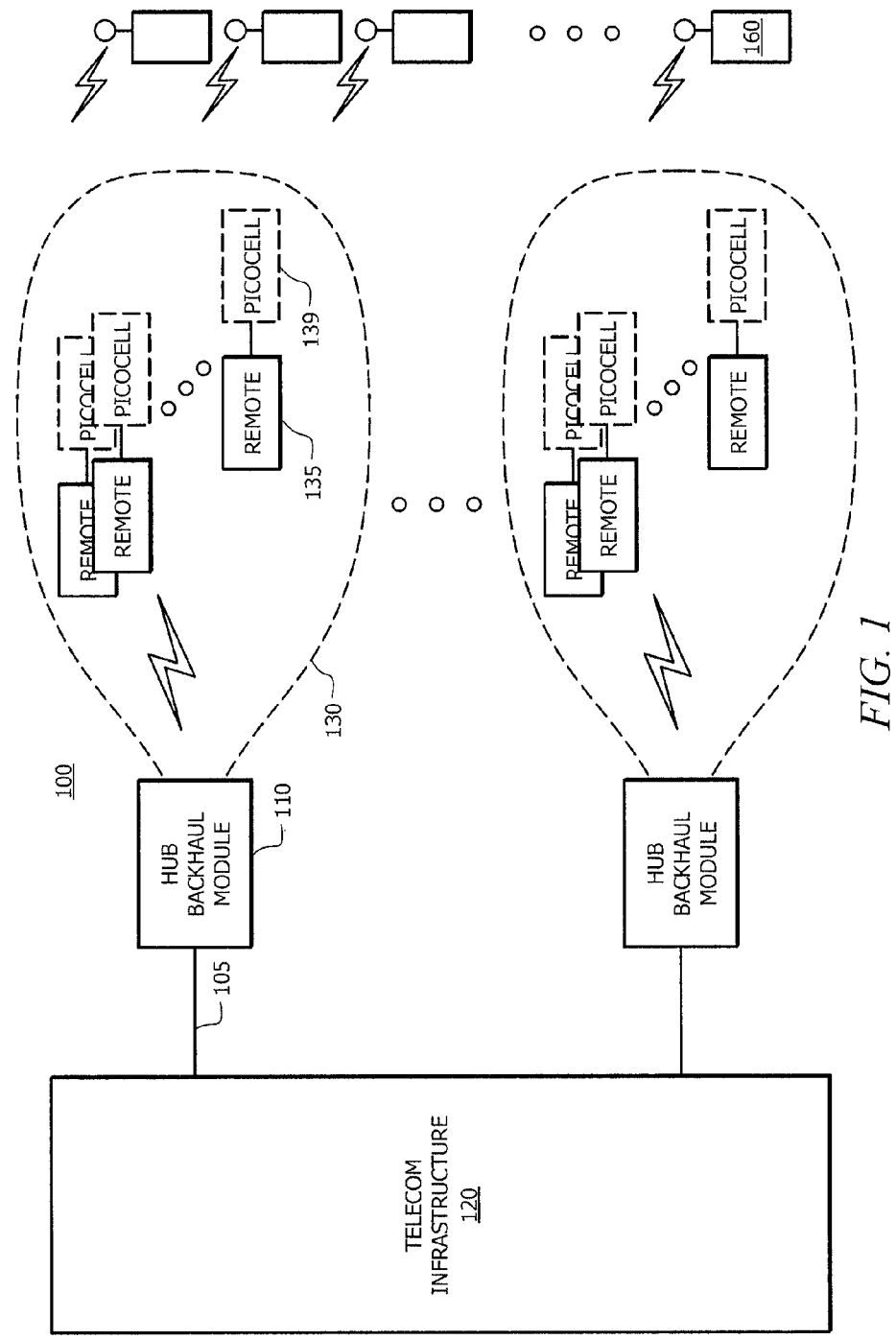
FIG. 1 is an illustration of a communication network that includes a wireless backhaul network, in accordance with one embodiment of the present invention.

Reference will now be made in more detail to preferred embodiments of the present invention, systems and methods for frequency reuse in a multi-cell deployment model of a wireless backhaul network. While the invention will be described in conjunction with preferred embodiments, it will be understood that they are not intended to limit the invention to these embodiments. On the contrary, the invention is intended to cover alternatives, modifications and equivalents which may be included within the spirit and scope of the invention.

Embodiments of the present invention provide for frequency reuse in a multi-cell deployment model of a wireless backhaul network, wherein the same pair of channels are used in a 1:2 frequency reuse pattern. Other embodiments of the present invention provide the above advantage and also provide for improved data rates, uniform distribution of the data throughput (e.g., downlink data rate) peak rate across a single cell, less interference from adjacent sectors in a multi-cell deployment model, less outage at the sector boundaries, and improved carrier to noise plus interference (CINR) ratios. In addition to or in the alternative to the foregoing, embodiments of the invention provide a backhaul network including a plurality of cells, each of which includes one or more hubs supporting wireless backhaul communication utilizing wireless communication frequency assignments adapted to facilitate expansion of the backhaul network by maintaining an orthogonal frequency face relationship between each cell of a cluster of cells having a number of sectors thereof being expanded and corresponding cell external to the cluster.

In a communication network that provides connectivity to the telecommunication infrastructure to an end customer, a base station, an access point or a subscriber box form the connection with the end customer. The challenge is the connectivity between the base station, access point or subscriber box and the telecommunication infrastructure. This connectivity is often referred to as wireless backhaul. Wireless backhaul can be provided by a center node, or hub, that controls the wireless communication with one or more remote nodes, or remote stations. These remote nodes and hub connect small base stations, access points or subscriber boxes to their telecommunications provider. Remote nodes are spread out through a community to wirelessly connect small base stations, access points or subscriber boxes to their provider. In general, remote nodes are paired with a corresponding base station, access point, or subscriber box, and fixed to a point in space. For instance, the pair may be deployed on a wall of a building, lamp post, street sign pole, utility pole or any other object that is capable of supporting the pair of devices at street level. As such, a wireless backhaul network provides an alternative communication platform over the more typical wired connection back to small base stations, access points or subscriber boxes through buried or suspended telephone lines.

As a result, as the number of users increase over a particular geographic area, the network of remote nodes, and corresponding hubs that support the remote nodes, is scalable to quickly meet the increase in demand. In addition, a layout of remote nodes and corresponding hubs is capable of providing wireless backhaul to small base stations, access points or subscriber boxes that is more economical than a service that provides a wired connection to the small base stations, access points or subscriber boxes. Further, in the fast paced world of conducting business on-the-go, the network of remote nodes is able to provide telecommunication service to small base stations, access points, or subscriber boxes that cannot be serviced by a fixed-point wired connection.

FIG. 1 is an illustration of an exemplary communication system 100 that includes a wireless backhaul network, in accordance with one embodiment of the present invention. System 100 generally represents a communication network implementing one or more wireless backhaul networks of embodiments of the present invention, and for purposes of clarity and illustration may not include all of the components necessary for a fully functional communication system.

In addition, communication system 100 supports one or more communication protocols suitable for providing communication between one or more end customers 160 and their respective telecommunication infrastructure 120, and is not intended to be limited to any one particular communication protocol. As an example, system 100 provides for broadband communication through the delivery of packets between various elements and components providing communication between end customers. In addition, the same or different communication protocols may be used between different components of communication system 100. For instance, the Ethernet protocol may be used between two components of system 100, while the transmission control protocol/internet protocol (TCP/IP) standard may be used between another two components of system 100, and further one of the IEEE 802.16 substandards or fourth generation (4G) long term evolution (LIE) substandards may be also be used between other components of system 100.

More particularly, embodiments of the present invention are intended to provide for a wireless backhaul network that is capable of supporting any communication protocol. The wireless backhaul network in communication system 100 includes one or more aggregation backhaul modules 110 (hereinafter referred to as "hubs") that provide access to a telecommunications infrastructure 120 over a wired or wireless interface 105. Generally, the telecommunications infrastructure 120 supports telecommunication providers, that in turn support the linking together of various end customers 160. For instance, the telecommunications infrastructure 120 supports one or more governmental or commercial providers that support telecommunication services for multiple end customers 160. As an example, infrastructure 120 may include a wireless core network for packet and circuit switch voice or data, as well as other communication networks. As such, the telecommunications infrastructure 120 links together all customers of the communication system 100 such that a customer from one provider may communicate with another customer from another provider through infrastructure 120.

Each of the hubs 110 support a cluster 130 of one or more remote nodes 135 to provide for wireless backhaul. The hub 110 controls communication with each of remote nodes 135 within its dedicated cluster 130 of remote nodes, and provides connectivity back to the telecommunication infrastructure 120. As will be described below, in embodiments, hub 110 is a center hub, a sector hub, or a combination of the above.

Communication with remote nodes 135, either directly between remote nodes or through the telecommunication infrastructure 120, requires the communicative coupling of the remote nodes 135 to corresponding hubs 110 through a wireless backhaul network. That is, the backhaul network communicatively couples a remote station 135 with a corresponding hub 110, which in turn provides for communicative coupling back to the telecommunication infrastructure 120. More specifically, in one embodiment for increased scalability the backhaul network provides for non-line-of-sight (NLOS) wireless communications between a remote node 135 and a corresponding hub 110.

As shown in FIG. 1, a telecommunications provider utilizes a backhaul network to provide communication to its end customers 160. For purposes of clarity and illustration, a picocell 139, which is an example of a small base station, access point or subscriber box, provides for wireless communication to one or more end customers 160, that may or may not be mobile. Picocell 139 may support third generation (3G), fourth generation (4G), Wi-Fi and other types and generations of communication networks and/or standards. Given that a picocell 139 as a system is more manageable (typically the size of a laptop computer or small suitcase) than macrocell base stations providing connectivity to remote units (e.g., mobile phones, laptops, personal digital assistants, phones, etc.), picocell deployment within a geographic area provides for increased coverage in areas that are difficult to service, and provides for increased data throughput in higher traffic areas that need increased bandwidth to support its customers. The configuration shown in FIG. 1 utilizing wireless connectivity to end customers through a picocell network may be achieved at a more attractive cost than other services providing connectivity, or last mile coverage, to end customers. For instance, because of its smaller size, typical deployment of one or more picocells may occur on a wall of a building, lamp post, street sign pole, utility pole or any other object that is capable of supporting the device at street level.

While embodiments of the present invention are described within the context of providing a wireless backhaul network providing picocell coverage, other embodiments of the present invention support backhaul networks that communicatively couple end-customers of the remote stations 135 to their telecommunication providers through any type of platform, to include macrocells, femtocells, superfemtocells, outdoor femtocells, access points, compact base stations, etc. Embodiments of the invention may, for example, provide wireline links to the end customers, such as by providing Ethernet network links coupled to a remote node herein (e.g., using a router, switch, or other Ethernet network device in place of a picocell shown in FIG. 1), to thereby provide wireless backhaul for a wireline network. Of course, combinations of wireless and wireline end customer equipment may be supported according to embodiments of the invention.

In addition, each picocell 139 is communicatively coupled to a corresponding remote station 135. This may be achieved through a wired or wireless connection. In one implementation, a remote station 135 and picocell are deployed together in a single location, such as on a lamppost. In one implementation, because of their proximity, the devices may be coupled together through a wired connection to provide the best performance over a wired connection. In other instances, where a wired connection is not possible, a wireless connection may be implemented. As a result, the end customer 160 is communicatively coupled to its telecommunication provider through a path including a corresponding picocell 139, remote station 135, wireless backhaul link to a corresponding hub 110, and through the telecommunication infrastructure 120.

Figure 2A:
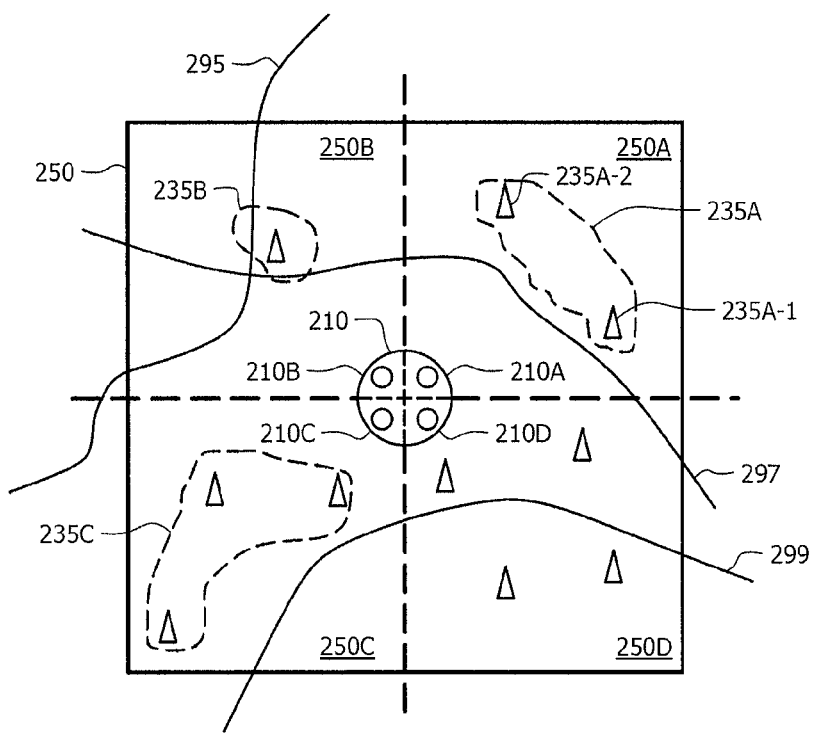
FIG. 2A is an illustration of a cell of a network implementing a wireless backhaul network, in accordance with one embodiment of the present invention.

FIG. 2A is an illustration of the deployment of clusters of remote nodes in a cell 250 in a network 200A providing wireless backhaul throughout cell 250, in accordance with one embodiment of the present invention. The cell 250 in FIG. 2A provides a more detailed illustration of the relationship between hubs and remote nodes provided in FIG. 1. More specifically, the cell 250 defines a geographic area over which a wireless backhaul network is supported. That is, cell 250 defines the coverage area in which wireless backhaul is available as supported by one or more hubs and remote nodes. More specifically, cell 250 is divided into four sectors, sector 250A in the upper right corner, sector 250B in the upper left corner, sector 250C in the lower left corner, and sector 250D in the lower right corner. As the number of customers increases, or as demand for bandwidth increases, more hubs and remote nodes defining one or more cells can be added in a scalable fashion to quickly service the increase in customers and/or demand.

As shown in FIG. 2A, cell 250 shows a wireless backhaul coverage area that includes three roads 295, 297, and 299. The area defined by cell 250 is representative of any area that requires wireless backhaul services. For instance, the area may be a downtown region of a small or large town, a suburban area populated by residential homes and small retail businesses, a remote area that is sparsely populated, or a combination of the above.

In particular, cell 250 includes a center hub 210 of a backhaul network 200A that supports wireless backhaul throughout at least cell 250. It should be appreciated that a cell, or a sector thereof, is not required to have a hub (and correspondingly, need not have remotes deployed therein) if there is insufficient traffic or coverage is otherwise not needed. However, the cell and sector(s) thereof should be planned to ensure optimal performance when, in the future, a hub and remotes are deployed. Such advanced planning of frequency reuse is provided according to embodiments of the present invention.

As shown, center hub 210 is approximately located in the center of cell 250 so that all sectors of cell 250 may be supported equally. The center hub 210 supports one or more clusters of remote nodes in order to provide wireless backhaul coverage in the geographic area defined by cell 250. For instance, sector 250A defines a geographic area in cell 250 over which coverage is provided for wireless backhaul by the combination of center hub 210 and a cluster 235A of remote nodes. Cluster 235A includes remote node 235A-1 and remote node 235A-2. As an example, sector 250A may be a mountainous area traversed by road 297, wherein remote nodes in the cluster 235A are positioned to provide mobile service to users traveling on road 297. In addition, sector 250B defines a geographic area in cell 250 over which coverage is provided for wireless backhaul by center hub 210 and a cluster 235B of remote nodes. Cluster 235B includes one remote node. Sector 250B may be an area with concentrated usage areas in which the demand for service can be covered using one remote node in cluster 235B. Further, sector 250C defines a geographic area in cell 250 over which coverage is provided for wireless backhaul by center hub 210 and a cluster 235C of remote nodes. Cluster 235C includes three remote nodes. As an example, sector 250C may be a residential area. Also, sector 250D defines a geographic area in cell 250 over which coverage is provided for wireless backhaul by center hub 210 and a cluster 235D of remote nodes. Cluster 235D includes four remote nodes. As an example, sector 250D may be a more populated area, such as a downtown area, or major commute corridor.

It is important to note that the number of remote nodes in each cluster providing wireless backhaul to sectors 250A-D is not fixed. For instance, though cluster 235A providing. wireless backhaul coverage to sector 250A includes two remote nodes, remote nodes may be added or deleted depending on the demand for bandwidth by end customers. That is, if there is an increase in demand, more remote stations may be deployed into sector 250A, or if already deployed in anticipation may be brought on-line into the wireless backhaul network 200A. As the number of customers grows, or as demand for bandwidth grows, throughout a geographic area, more remote nodes can be added to a cluster in a scalable fashion to quickly service the increase in customers and/or demand.

In one embodiment, center hub 210 supports wireless backhaul over the geographic area defined at least by cell 250. That is, center hub 210 controls and coordinates wireless backhaul with one or more of the clusters of remote nodes 235A-D in cell 250. As such, center hub 210 is configured to handle wireless backhaul traffic to one or more sectors throughout cell 250. In other embodiments, center hub 210 includes one or more sector hubs that are dedicated to control and coordinate wireless backhaul with a corresponding cluster of remote nodes in a particular sector. For instance, as shown in FIG. 2A, center hub 210 includes sector hubs 210A-210D, where sector hub 210A provides wireless backhaul to cluster 235A in sector 250A, sector hub 210B provides wireless backhaul to cluster 235B in sector 250B, sector hub 210C provides wireless backhaul to cluster 235C in sector 250C, and sector hub 210D provides wireless backhaul to cluster 235D in sector 250D. In still other embodiments, a sector hub provides wireless backhaul to one or more clusters of remote nodes in one or more sectors in cell 250.

Figure 2B:
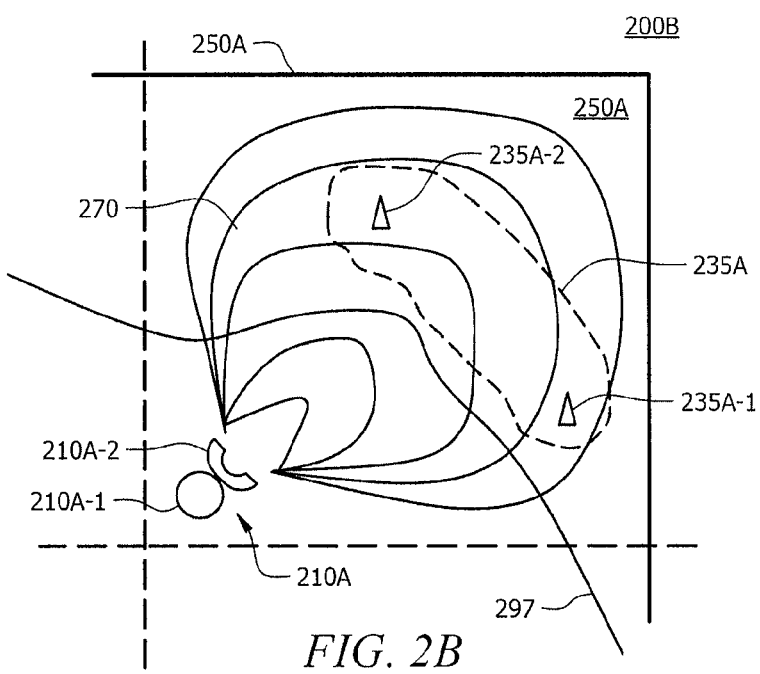
FIG. 2B is an illustration of a backhaul network providing wireless backhaul throughout a sector of a cell, in accordance with one embodiment of the present invention.

FIG. 2B is an illustration of part of a network 200B providing wireless backhaul throughout sector 250A of cell 250, in accordance with one embodiment of the present invention. As shown, sector hub 210A of center hub 210 provides dedicated wireless backhaul throughout sector 250A in combination with cluster 235A of remote nodes. Alternatively, as previously described, the functions provided by sector hub 210A may be provided solely by center hub 210.

Sector hub 210A includes, in part, radio frequency (RF) equipment 210A-1, as well as other control units for controlling wireless backhaul traffic between the sector hub 210A and the cluster of remote nodes 235A. Sector hub 210A also includes one or more antennas 210A-2 that spread a corresponding beam pattern 270 throughout sector 250A. The one or more antennas 210A-2 are configured such that the beam pattern 270 is focused to primarily provide coverage within sector 250A. For instance, the main lobe of beam pattern 270 may be concentrated within sector 250A.

As shown in FIG. 2B, one or more remote nodes are located within sector 250A and interact with sector hub 210A to provide wireless backhaul communication. For illustration, two remote nodes 235A-1 and 235A-2 are shown in cluster 235A, although any number of remote nodes may be used. The remote nodes in cluster 235A in combination with sector hub 210A provide wireless backhaul throughout sector 250A. The remote nodes in cluster 235A are deployed in a particular pattern to achieve the best signal coverage of the demand exhibited within sector 250A. For instance, remote nodes 235A-1 and 235A-2 may be deployed near road 297 to provide wireless backhaul coverage in support of end customers who may be traveling on road 297. Additional remote nodes may be included within sector 250A to provide even better wireless backhaul coverage.

Figure 3:
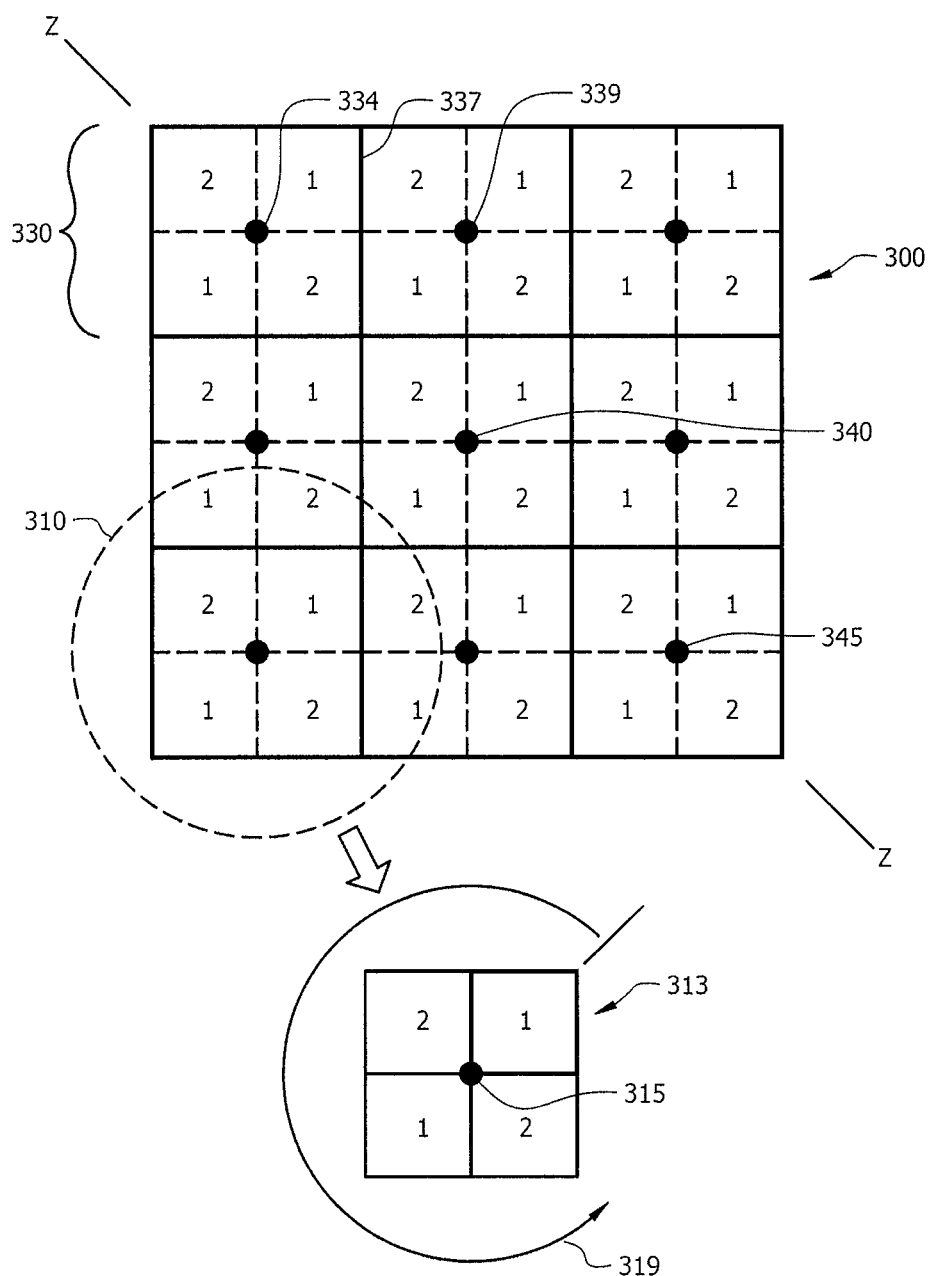
FIG. 3 is an illustration of a multi-cell layout, wherein all cells have similar frequency reuse patterns.

FIG. 3 is an illustration of a multiple-cell (multi-cell) deployment 300, wherein all cells have similar frequency reuse patterns. A cell consists of multiple sectors that are deployed throughout a geographic area. In the deployment 300 of multiple cells, cell 310 is representative of one of the cells, and illustrates a backhaul network that includes a center hub and several remote nodes that are spread across four geographic sectors. In general, center hub is approximately located in a center location 315 of cell 310, depending on constraints due to geographic and physical environment conditions. Center hub may include one or more sector hubs, each of which is dedicated to providing wireless backhaul to a corresponding sector of the cell 310. Each sector is capable of supporting one or more remote nodes. Cell 310 is generally represented by a square in FIG. 3. More specifically, the footprint for cell 310 represents a geographic area over which center hub and/or sector hubs and their corresponding remote nodes form a backhaul network.

In addition, as shown in FIG. 3, cell 310 includes an alternating 1:2 frequency reuse pattern, where two frequency bands or channels (e.g., channels 1 and 2) are reused within a single cell, such as cell 310, to improve the spectral efficiency of the available bandwidth. In particular, the two channels are alternated between adjacent sectors of cell 310 in an effort to reduce interference problems. For consistency throughout this Application, the frequency reuse pattern is described starting with the sector located in the top-right corner of the cell. As such, starting with sector 313 in the top-right corner of cell 310, moving in a counter-clockwise direction 319, the 1:2 frequency reuse pattern is 1-2-1-2.

More specifically, cell 310 is used in a repeating pattern throughout the multi-cell deployment 300. For instance, a row of cells comprises one or more cells 310 configured such that two adjacent cells 310 in the row share a common edge. For instance, in row 330, a common edge 337 is shared by cells defined by hub 334 and hub 339. In addition, a column of cells comprises one or more cells 310 configured such that two adjacent cells in the column also share a common edge. As such, the hubs in the multi-cell deployment 300 approximately form a uniform grid.

It is understood that the deployment 300 is merely representative of the layout of multiple cells 310 over a geographic area. In practice, the physical layout of hubs of corresponding cells may vary slightly from that depicted in deployment 300 depending on physical and geographic limitations. Additionally, some sectors in deployment 300 may not be populated with corresponding sector hubs and remote nodes. That is, in a particular cell in deployment 300 some sectors may have wireless backhaul coverage while other sector or sectors are without backhaul coverage. Further, some cells in deployment 300 may not be populated with corresponding center hubs and remote nodes. In that case, a corresponding cell does not have backhaul coverage. Holes in backhaul coverage within cells or sectors of a cell will often occur while the overall wireless backhaul network is being developed.

Since each channel of frequencies is used twice in a cell 310, there will be interference among sectors of the same cell in a single cell deployment model, thereby reducing the signal to noise ratio, or more particularly, the carrier to noise plus interference ratio (CINR). This translates to lower data rates, and overall lower throughput in the cell 310. Additionally, although FIG. 3 illustrates a 1:2 frequency reuse pattern in the multi-cell deployment 300, the interference problem exists in other frequency reuse patterns, such as a 1:1 frequency reuse patter, or 1:3 frequency reuse pattern.

In addition, the interference is further evidenced in the multi-cell deployment model 300. For instance, in a center cell defined by center location 340, there is interference that is, in part, due to center hub configurations of neighboring cells that lie on a line defining the mid-line of a corresponding sector, or a bore sight of the center cell. Neighboring cells include those defined by center location 334 and center location 345. As an example, sectors supporting channel "2" lie on a diagonal line Z-Z of the multi-cell deployment 300 running from the top left corner to the lower right corner and through the center hub located at center location 340, and other hubs located at center locations 334 and 345. As such, since sectors with the same frequencies (channel "2") are located on the diagonal of the cell layout supported by center cell defined by center location 340, any remote station located on the bore sight of the center cell on line Z-Z will see more than one hub from neighboring cells all supporting the same channel. This leads to CINR degradation, especially on the edges and bore sights of the sectors of the center cell defined by center location 340.

Figure 4:
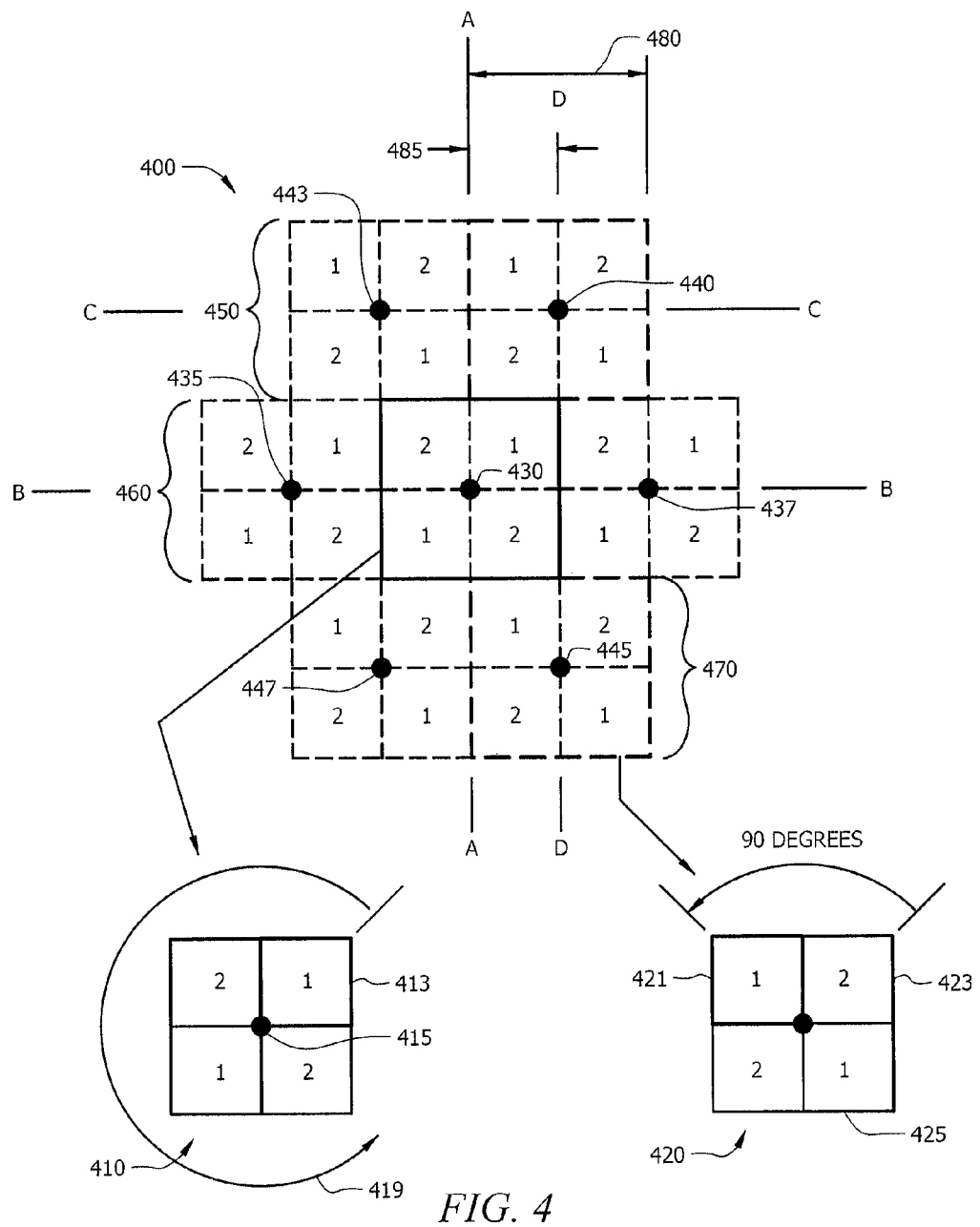
FIG. 4 is an illustration of a multi-cell deployment model, wherein the hub grid is shifted by a cell radius between two rows of cells, and where the frequency reuse patterns between cell rows are rotated by ninety-degrees, in accordance with one embodiment of the present invention.

FIG. 4 is an illustration of a multi-cell deployment 400, wherein the hub grid is shifted by a cell radius between two cells and/or two rows of cells, and where the frequency reuse patterns between cell rows are rotated by ninety-degrees, in accordance with embodiments of the present invention. In comparison to the uniform deployment of cells in FIG. 3, the multi-cell deployment 400 of FIG. 4 exhibits reduced interference between hubs of neighboring cells, thereby increasing CINR, in one embodiment. In addition, the multi-cell deployment 400 having a 1:2 frequency reuse pattern outperforms other frequency reuse patterns across the same frequency channels in both single cell and multi-cell scenarios, in other embodiments. Further, in still another embodiment of the present invention, the multi-cell deployment 400 exhibited in FIG. 4 exhibits a more uniform distribution of data throughput (e.g., downlink) peak rate across a cell, compared to other frequency reuse patterns on the same frequency channels.

In the deployment 400 of multiple cells, there are two types of cells utilized: a first cell 410 and a second cell 420, each of which illustrate a corresponding backhaul network including a center location populated with a center hub, that may include one or more sector hubs, and one or more remote nodes spread throughout sectors of a corresponding cell. In particular, the frequency pattern of the second cell 420 is similar in configuration to the frequency pattern of the first cell 410, but is rotated by ninety degrees within deployment 400, as will be described below.

First cell 410 illustrates part of a backhaul network that includes a center hub and/or one or more sector hubs approximately located at center location 415, and one or more remote nodes spread across four geographic sectors. That is, each sector is capable of supporting one or more remote nodes for purposes of forming part of a backhaul network. First cell 410 is generally represented by a square in FIG. 4. More specifically, the footprint for cell 410 represents a geographic area over which a center hub approximately located at a center location 415 communicates with corresponding remote nodes located within the sectors of the cell 410 in order to form a backhaul network.

In one embodiment, center hub at center location 415 includes one or more directional antennas to form corresponding beam patterns into each of the sectors. For instance, in one implementation a center and/or sector hub at center location 415 includes a 90 degree horizontal beamwidth antenna having 16 dBi gain that radiates a beam pattern into one of the four sectors of the first cell 410.

In addition, a remote node located in one of the sectors of the first cell 410 includes a highly directional antenna pointed to a corresponding center and/or sector hub to form a communicative link between the two nodes for providing wireless backhaul. In one instance, the hub to which the antenna is pointed is at the center location 415 of the cell. In another instance, the hub to which the antenna of the remote station is pointed is located in an adjacent cell. As an example, the remote antenna may form a 15 degree antenna beam with 18 dBi gain. The antennas described above are equally applicable to remote node configurations of the second cell 420.

In addition, first cell 410 is representative of a first 1:2 alternating frequency reuse pattern, where two frequency bands or channels are reused within a single cell to improve the spectral efficiency of the available bandwidth, and is used in the multi-cell deployment 400. In particular, the two channels are alternated between adjacent sectors of cell 210 in an effort to reduce interference problems. For instance, sector 413 is supported by a first channel (represented by the number "1"), and adjacent sectors in cell 410 to sector 413 are supported by a second channel (represented by the number "2"). Moving in a counter-clockwise direction 419 and starting with sector 413 in the top-right corner of cell 410, the 1:2 frequency reuse pattern is 1-2-1-2.

Also, multi-cell deployment 400 includes a second cell 420 that is representative of a second alternating frequency reuse pattern. Cell 420 is generally represented by a square footprint including four geographic sectors, each of which may support one or more remote nodes to form a backhaul network with a corresponding hub. In addition, as shown in FIG. 4, the second alternating frequency reuse pattern exhibits a 1:2 frequency reuse pattern, where two frequency bands or channels are alternated between adjacent sectors within the second cell 420. More particularly, the second alternating frequency reuse pattern is similar to the first alternating frequency reuse pattern of the first cell 410, but is rotated by ninety degrees, such that the first channel is now in the top left sector 421 and lower right sector 425. As such, beginning with the upper right sector 423 of second cell 420 and moving over the four sectors in a counterclockwise direction, the second alternating frequency reuse pattern provides a 2-1-2-1 pattern, again where a first channel "1" and a second channel "2" alternate between adjacent sectors.

In one embodiment, the frequency bandwidth allocated to the first cell 410 and the second cell 420 is a combined total of approximately 20 MHz. The total bandwidth is allocated equally between the two channels. As such, the first channel includes a bandwidth of 10 MHz, and the second channel includes a bandwidth of 10 MHz. In one embodiment, the first channel and the second channel do not have contiguous frequencies.

In another embodiment, the combined frequency bandwidth allocated to the first cell 410 and the second cell 420 combined is less than 20 MHz. As such, the first channel could include a bandwidth of 3, 5, 7 or 10 MHz (as examples), and the second channel includes a bandwidth of 3, 5, 7 or 10 MHz (as examples). In embodiments, the total bandwidth may or may not be allocated equally between the two channels. Also, in one embodiment, the first channel and the second channel do not have contiguous frequencies.

In still another embodiment, the combined frequency bandwidth allocated to both the first cell 410 and the second cell 420 is more than 20 MHz. As such, the first channel includes a bandwidth of 3, 5, 7, 10, 15 or 20 MHz (as examples), and the second channel includes a bandwidth of 3, 5, 7, 10, 15 or 20 MHz (as examples). In embodiments, the total bandwidth may or may not be allocated equally between the two channels. Also, in one embodiment, the first channel and the second channel do not have contiguous frequencies.

More particularly, the configuration of hubs in the backhaul network includes a first cell and a second cell, as previously described, in accordance with one embodiment of the present invention. As an example, in FIG. 4, one first cell 410 includes a center hub, that may include one or more sector hubs, and is centrally located approximately at center location 430. This first cell may also be referred to as the center cell, and is outlined by a bolded and solid line. In addition, the backhaul network layout includes one second cell 420 including a center hub, that may include one or more sector hubs, wherein the second cell 420 is centrally located approximately at center location 440, and is outlined by a bolded and dotted line.

Also, the second cell located at center location 440 is vertically adjacent to the center cell defined by center location 430. That is, as shown in FIG. 4, the second cell located approximately at center location 440 is located geographically above the center cell located approximately at center location 430.

In addition, the second cell is offset the first cell by a cell radius. More particularly, a vertical line D-D through the center hub located at center location 440 of the second cell is offset from a parallel vertical line A-A through the center hub located at center location 430 of the first cell by a cell radius 485 (i.e., cell 440 is offset horizontally with respect to call 430), in one embodiment. As shown in FIG. 4, the cell radius 485 is one-half of the full edge 480 of a representative cell. Put another way, cell radius 485 is half the distance between the center locations of two adjacent cells in a row of cells, such as the row defined by line B-B, in another embodiment. As such, instead of lying on a vertical line A-A that goes through the center location 430 of the first cell, the center hub located at center location 440 of the second cell is offset from the vertical line A-A by cell radius 485, and is located on vertical line D-D. Put another way, the second cell 420 as defined by center location 440 shares one-half of a full edge with the first cell 410 defined by center location 430, in another embodiment.

It is important to note that the second cell 420 that is vertically adjacent to the first cell 410 or center cell defined by center location 440 could be located in anyone of four locations. Specifically, the second cell 420 could be vertically located above the center cell and offset to the right by a cell radius 485 to include center location 440, as described above. In addition, the second cell 420 could be vertically located above the center cell defined by center location 430 and offset to the left by a cell radius 485 to include center location 443. Also, the second cell 420 in the backhaul network could be vertically located below the center cell defined by center location 430 and offset to the right by a cell radius 485 to include center location 445. Further, the second cell 420 in the backhaul network could be vertically located below the center cell defined by center location 430, and offset to the left by a cell radius 485 to include center location 447.

In another embodiment, the multi-cell deployment 400 illustrates another backhaul network. The backhaul network includes a plurality of cells, and more specifically, includes first cells 410 and second cells 420. As previously described, each of the first or second cells comprises a center hub, that may include one or more sector hubs, supporting wireless backhaul communication over four corresponding geographic sectors.

Further, the backhaul network includes a first row 460 of the plurality of cells. The first row 460 comprises a plurality of first cells 410 previously described. That is, each of the first cells 410 is configured to support a first alternating frequency reuse pattern of a first channel and a second channel over four corresponding geographic sectors. Moreover, adjacent first cells 410 in the first row 460 are aligned without any offset. That is, edges of two adjacent cells are aligned without any offset, such that the two adjacent first cells 410 share an edge.

Also, center hubs in the first cells 410 of the first row 460 lie approximately on a horizontal line (e.g., line B-B). For instance, as shown in FIG. 4, the center cell defined by center location 430 is adjacent to another first cell 410 located directly to the right, and to another first cell 410 located directly to the left. Row 460 includes other first cells 410 (not shown) following the same configuration described above, in one embodiment.

In addition, the backhaul network includes a second row 450 of the plurality of cells. The second row comprises a plurality of second cells 420 previously described. That is, each of the second cells is configured to support a second alternating frequency reuse pattern over four corresponding geographic sectors. The second alternating frequency reuse pattern comprises the first alternating frequency reuse pattern that is rotated by ninety degrees. Moreover, adjacent second cells 420 in the second row 450 are aligned without any offset. That is, edges of the two adjacent cells are aligned without any offset, such that the two adjacent second cells 420 share an edge. Also, center hubs in the second cells of the second row 450 lie approximately on a horizontal line, that is approximately parallel to line B-B. For instance, as shown in FIG. 4, the cell defined by center location 443 is adjacent to another second cell 420 located to the right that is defined by center location 440. Row 450 includes additional second cells 420 (not shown) following the same configuration described above, in one embodiment.

Further, the second row 450 is adjacent to the first row 460. As shown in FIG. 4, second row 450 is located above first row 460, but could be located below first row 460, as evidenced by row 470 that also includes a plurality of second cells 420. In addition, the second row 450 is offset by a cell radius 485 from the first row 460, such that a corresponding second cell in the second row 450 is adjacent to a corresponding first cell 410 in the first row 460, and is offset by a cell radius 485, or offset by half a full edge 480 of the corresponding first cell 410 or second cell 420. More specifically, the second cell 420 in the second row 450 is vertically adjacent to a corresponding first cell 410 in the first row 460 (such as the second cell defined by center location 440 and the first cell defined by center location 430). Put another way, a vertical line D-D through the center location 440 of the second cell 420 in the second row 450 is offset from a vertical line A-A through the center location 430 of the corresponding first cell 410 in the first row 460 by a cell radius 485. This relationship is repeated for corresponding first cells 310 and corresponding second cells 320 in both first and second rows 460 and 450, respectively.

The backhaul network includes a third row of cells, in one embodiment. The third row comprises another plurality of second cells 420, each of which is configured to support the second alternating reuse pattern over four corresponding geographic sectors. Moreover, adjacent second cells 420 in the third row 470 are aligned without any offset. That is, edges of the two adjacent cells are aligned without any offset, such that the two adjacent second cells 420 share an edge. Also, center hubs in the cells of the third row 470 lie approximately on a horizontal line, that is approximately parallel to lines B-B and C-C. For instance, as shown in FIG. 4, the second cell defined by center location 447 is adjacent to another second cell 420 located to the right that is defined by center location 445. Row 470 includes additional second cells 420 (not shown) following the same configuration described above, in one embodiment.

In addition, the third row 470 is adjacent to the first row 460, such that the first row 460 is between the second row 450 and the third row 470. A corresponding second cell 420 in the third row 470 is aligned to a corresponding first cell 410 in the first row 460 with an offset of a cell radius 485, or half an edge of the first cell 410.

As shown in FIG. 4, third row 470 is located below first row 460. In addition, the third row 470 is offset by a cell radius 485 from the first row 460, such that a corresponding second cell in the third row 470 is adjacent to a corresponding first cell 310 in the first row 460, and is offset by a cell radius 485, or offset by half a full edge 480 of the first cell 410 or second cell 420. More specifically, the second cell 420 in the third row 470 is vertically adjacent to a corresponding first cell 410 in the first row 460 (such as the second cell 420 defined by center location 447 and the first cell 410 defined by center location 430). For the offset, the center hub(s) of second cells 420 in the third row 470 is offset from the center hub(s) of corresponding first cells 410 in the first row 460 by a cell radius 485. Put another way, a vertical line D-D through the center location 445 of the second cell 420 in the third row 470 is offset from a vertical line A-A through the center location 430 of the corresponding first cell 410 in the first row 460 by a cell radius 485. This relationship is repeated for corresponding first cells 410 and corresponding second cells 420 in both first and third rows.

Further, the backhaul network includes a fourth row of cells (not shown), in one embodiment. The fourth row comprises another plurality of first cells 410, each of which is configured to support the first alternating reuse pattern over four corresponding geographic sectors. Moreover, adjacent first cells 410 in the fourth row (not shown) are aligned without any offset. That is, edges of the two adjacent cells are aligned without any offset, such that the two adjacent first cells 410 share an edge. Also, hubs in the cells of the fourth row lie approximately on a horizontal line that is approximately parallel to line B-B and to line C-C. Additionally, the fourth row is adjacent to the second row 450, such that the second row 450 is between the first row 460 and the fourth row (not shown), and wherein a corresponding first cell in the fourth row is aligned to a corresponding second cell in the second row 450 with an offset of a cell radius 485, or half a full edge 480, as previously described. In addition, the fourth row could be adjacent to the third row 470, such that the third row 470 is between the first row 460 and the fourth row (not shown), and wherein a corresponding first cell in the fourth row is aligned to a corresponding second cell in the third row 470 with an offset of a cell radius 485, or half a full edge 480, as previously described.

In another embodiment, the multi-cell deployment 300 illustrates another backhaul network. The backhaul network includes a plurality of cells, and more specifically, includes first cells 410 and second cells 420. As previously described, each of the first or second cells comprises one or more hubs supporting wireless backhaul communication over four corresponding geographic sectors. The backhaul network is comprised of two or more tiers of cells.

For instance, a first tier of cells comprises a center cell that is configured to support a first alternating frequency reuse pattern of a first channel and a second channel over four corresponding geographic sectors. As shown in FIG. 4, the center cell comprises a first cell 410, and includes center location 430.

A second tier of cells surrounds the first tier. In particular, the second tier includes a first cell 410 configured to support the first alternating reuse pattern, and wherein the first cell 410 is located horizontally adjacent to the center cell defined by center location 430. In one embodiment, the second tier includes both the first cells 410 located to the right and left of the center cell defined by center location 430, such as the first cell 410 defined by center location 435 and first cell 410 defined by center location 437.

In addition, the second tier of cells includes at least one second cell 420 that is configured to support the second alternating frequency reuse pattern. As shown in FIG. 4, the second cell 420 is located vertically adjacent to the center cell defined by center location 430. In one embodiment, the second cell 420 is located above and below the center cell. Further, the second cell 420 is offset from the center cell by a cell radius 485, as previously described, and for example, such that the second cell 420 and the center cell share one half of a full edge 480 of a representative cell. As such, the second tier could include second cells defined by hubs 440, 443, 445, and 447. In one embodiment, the second tier includes each of the cells defined by hubs 435, 437, 440, 443, 445, and 447.

As a result, the second tier of cells includes 6 cells comprising both first cells 410 and second cells 420, in one embodiment. Extending the tier model, the backhaul network includes a third tier of cells of 12 cells (not shown) surrounding the second tier of cells, and comprises both first cells 410 and second cells 420 that maintain the cell configuration and layout described above.

It is understood that the deployment 400 is merely representative of the layout of multiple cells over a geographic area. In practice, the physical layout of center hubs of corresponding cells may vary slightly from that depicted in deployment 400 depending on physical and geographic limitations. Additionally, in each of the embodiments described above for backhaul networks, some sectors in deployment 400 may not be populated with corresponding sector hubs and remote nodes. That is, in a particular cell in deployment 400 some sectors may have wireless backhaul coverage while other sector or sectors are without backhaul coverage. Further, some cells in deployment 400 may not be populated with corresponding center hubs and remote nodes. In that case, a corresponding cell does not have backhaul coverage. Holes in backhaul coverage within cells or sectors of a cell will often occur while the overall wireless backhaul network is being developed.

In each of the embodiments described above for backhaul networks, CINR degradation is greatly reduced along sector bore sights, and along vertical edges of sectors for a corresponding cell. This is mainly due to the offset of hubs of neighboring cells, since interference stems mostly from the sidelobe of a corresponding beam pattern radiating into one of those sectors, and not from the main beam. For instance, hubs between first and second tiers do not lie on any of the diagonals of the center cell defining the first tier, wherein the diagonals are formed between the corners of the center cell and the center location that is occupied by the hub. As such, hubs for neighboring cells in the second tier do not lie on any of these diagonals, thereby reducing interference between beam patterns of center hubs in the first and second tier.

Figure 5:
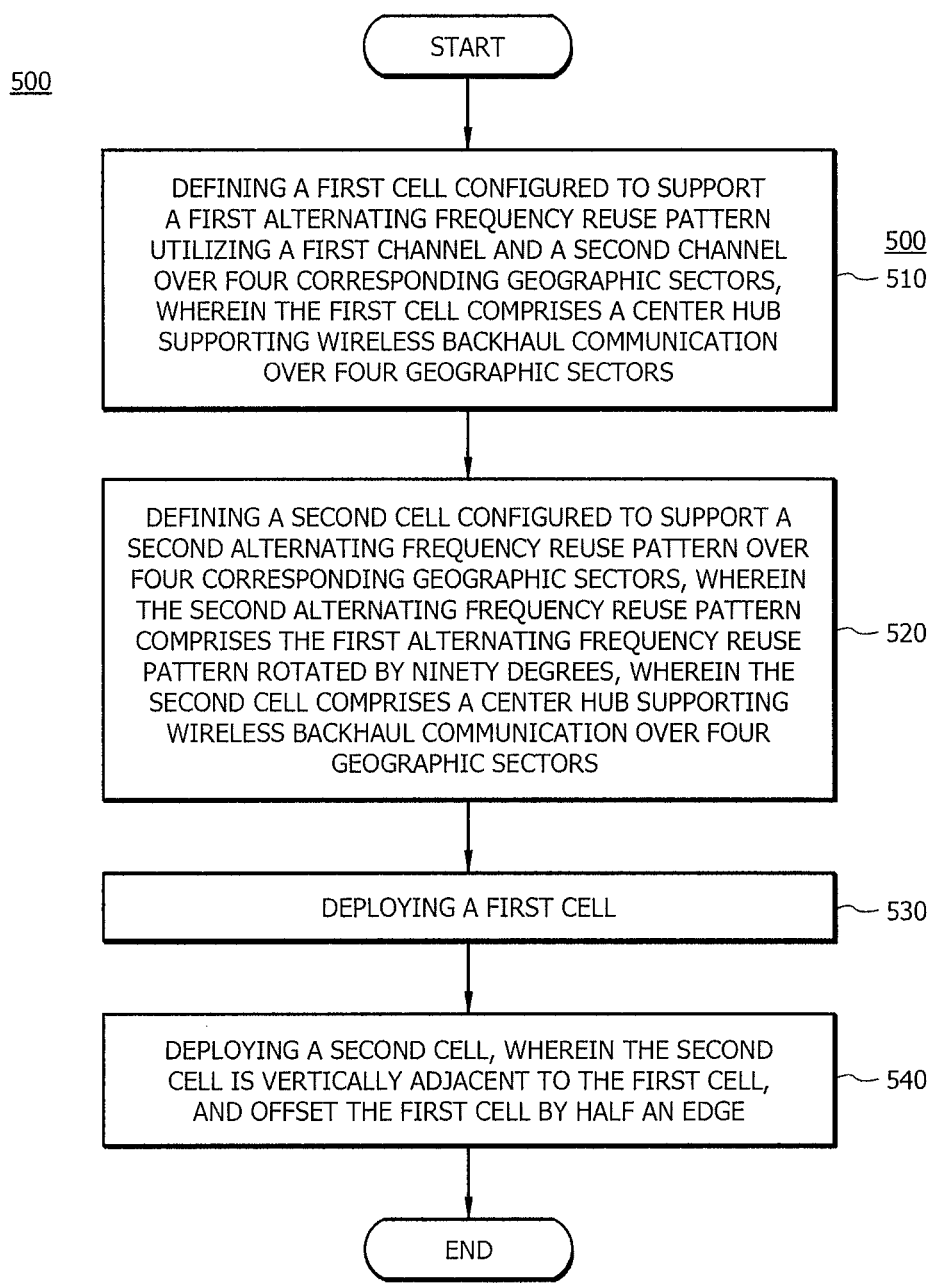
FIG. 5 is a flow diagram illustrating a method for deploying a multi-cell deployment model, wherein the hub grid is shifted by a cell radius between two rows of cells, and where the frequency reuse patterns between cell rows are differentiated or rotated by ninety-degrees, in accordance with one embodiment of the present invention.

FIG. 5 is a flow diagram 500 illustrating a method for deploying a multi-cell deployment model, wherein the hub grid is shifted by a cell radius between two rows of cells, and where the frequency reuse patterns between cell rows are rotated by ninety-degrees, in accordance with one embodiment of the present invention. The method outlined in FIG. 5 is implementable for deploying various embodiments of the multi-cell deployment 400 illustrated in FIG. 4, in accordance with embodiments of the present invention.

The method includes defining 510 a first cell (e.g., cell 410) that includes a center hub, that may include one or more sector hubs, and one or more remote nodes spread across four geographic sectors. Also, the first cell is configured to support a first alternating frequency reuse pattern, previously described, that utilizes a first channel and a second channel over the four corresponding geographic sectors. The footprint for the first cell represents a geographic area over which the center hub extends corresponding beam patterns for communication with corresponding remote nodes located within corresponding sectors deployed in a first cell in order to form a backhaul network.

The method also includes defining 520 a second cell (e.g., cell 420) that includes a center hub, that may include one or more sector hubs, and one or more remote nodes spread across four geographic sectors. Also, the second cell is configured to support a second alternating frequency reuse pattern, previously described. Specifically, the second alternating frequency reuse pattern comprises the first alternating frequency reuse pattern that is rotated by ninety degrees. The footprint for the second cell represents a geographic area over which the center hub extends corresponding beam patterns for communication with corresponding remote nodes located in corresponding sectors deployed in a second cell in order to form a backhaul network.

In addition, the first cell is deployed 530 over a geographic area. That is, the center hub of the first cell is deployed with one or more directional antennas that form corresponding beam patterns into each of the four sectors defining the geographic area. As such, the center hub is able to communicate with one or more remote nodes spread throughout four sectors of the first cell to form a backhaul network.

Further, the second cell is deployed 540 over a geographic area. That is, a corresponding center hub of the second cell is deployed with one or more directional antennas that form corresponding beam patterns into each of the four sectors defining the geographic area. As such, the center hub of the second cell is able to communicate with one or more remote nodes spread throughout four sectors to form a backhaul network.

In addition, the second cell is vertically adjacent to the first cell. That is, the second cell is located geographically above or below the center cell in a vertical direction. In addition, the second cell is offset from the first cell by a cell radius, or one-half a full edge of representative cell, as previously described. That is, the second cell could be offset to the left or right, and above or below the first cell. As such, the first cell and the second cell share one half of a full edge of a respective one of the cells.

The backhaul network formed by the method outlined in FIG. 5 is extendable to create rows of cells. In particular, a first row is deployed, wherein the first row comprises a plurality of first cells, and includes the first cell that is deployed. Adjacent first cells in the first row are aligned without any offset. That is, edges of the two adjacent cells are aligned without any offset, such that the two adjacent first cells share an edge. Also, center hubs in the cells of the first row lie approximately on a horizontal line.

In addition, the backhaul network is extendable to create another row of cells. In particular, a second row is deployed, wherein the second row comprises a plurality of second cells, and includes the second cell that is deployed. Adjacent second cells in the second row are aligned without any offset. That is, edges of the two adjacent cells are aligned without any offset, such that the two adjacent second cells share an edge. Also, center hubs in the cells of the second row lie approximately on a horizontal line, that is approximately parallel to the horizontal line defined as intersecting center hubs for first cells in the first row above.

Further, the second row is deployed adjacent to the first row. Also, the second row is offset by a cell radius from the first row, such that a corresponding second cell in the second row is adjacent to a corresponding first cell in the first row, and is offset by a cell radius, such that the second cell and the first cell share one half of a full edge of a representative cell.

Moreover, a third row is deployed that comprises another plurality of second cells. Edges of two adjacent second cells in the third row are aligned without any offset. In addition, the third row is adjacent to the first row, and opposite the second row such that the first row is between the second and third rows. Also, the third row is offset by a cell radius from the first row, such that a corresponding second cell in the third row is adjacent to a corresponding first cell in the first row, and is offset by a cell radius, as previously described. For instance, a second cell in the third row and a first cell in the first row share one half of a full edge of a representative cell.

Extending the deployment further, a fourth row is deployed that comprises another plurality of first cells. Edges of two adjacent first cells in the fourth row are aligned without any offset. In addition, the fourth row is adjacent to the third row, and opposite the first row, such that the third row is between the fourth and the first rows. Also, the fourth row is offset by a cell radius from the third row, such that a corresponding first cell in the fourth row is adjacent to a corresponding second cell in the third row, and is offset by a cell radius, as previously described. For instance, a corresponding first cell in the fourth row and a corresponding second cell in the third row share one half of a full edge of a representative cell.

Frequency reuse patterns, such as one or more of the foregoing exemplary frequency reuse patterns, may be utilized in accordance with embodiments of the invention to facilitate frequency planning for initial deployment, build out, and expansion (e.g., increased sectorization and channel reuse to provide increased communication capacity and/or more frequency robustness) in wireless backhaul networks which include a plurality of cells as described herein. As discussed above, embodiments comprise a plurality of cells providing wireless backhaul communication implementing a predetermined wireless frequency reuse pattern providing alternating utilization of a plurality of wireless communication frequencies by the cells of the backhaul network. The cell deployment geometry and frequency assignments are preferably made to accommodate the aforementioned expansion within the wireless backhaul network, such as to facilitate expansion of cell configurations from omni-directional to bi-sectored, from bi-sectored to quad-sectored, from quad-sectored to octal-sectored, etc. as demand, usage patterns, and/or other conditions change.

Figure 6A:
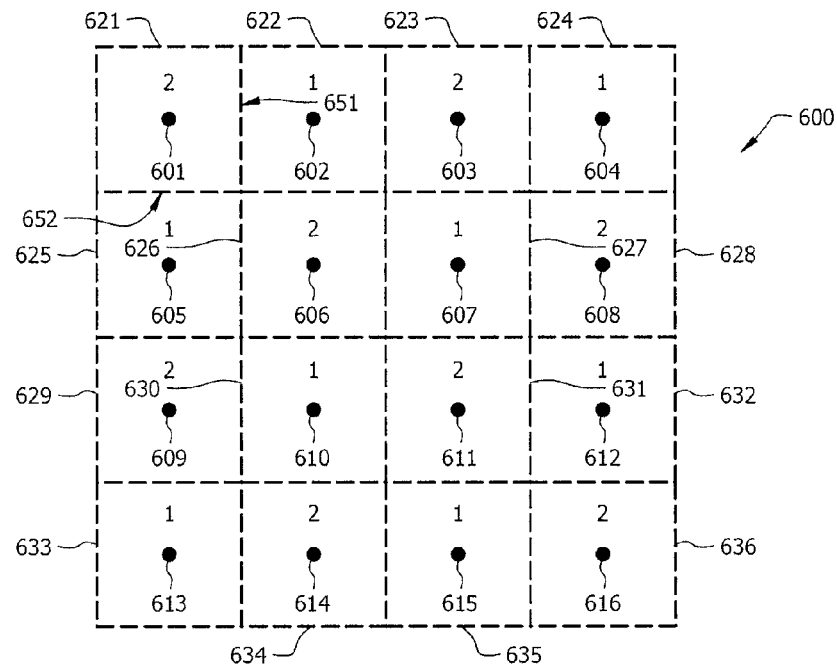
FIGS. 6A-6C are an illustration of a square cell deployment geometry wireless backhaul network implementing heterogeneous wireless backhaul network expansion techniques in accordance with embodiments of the present invention.
Figure 7A:
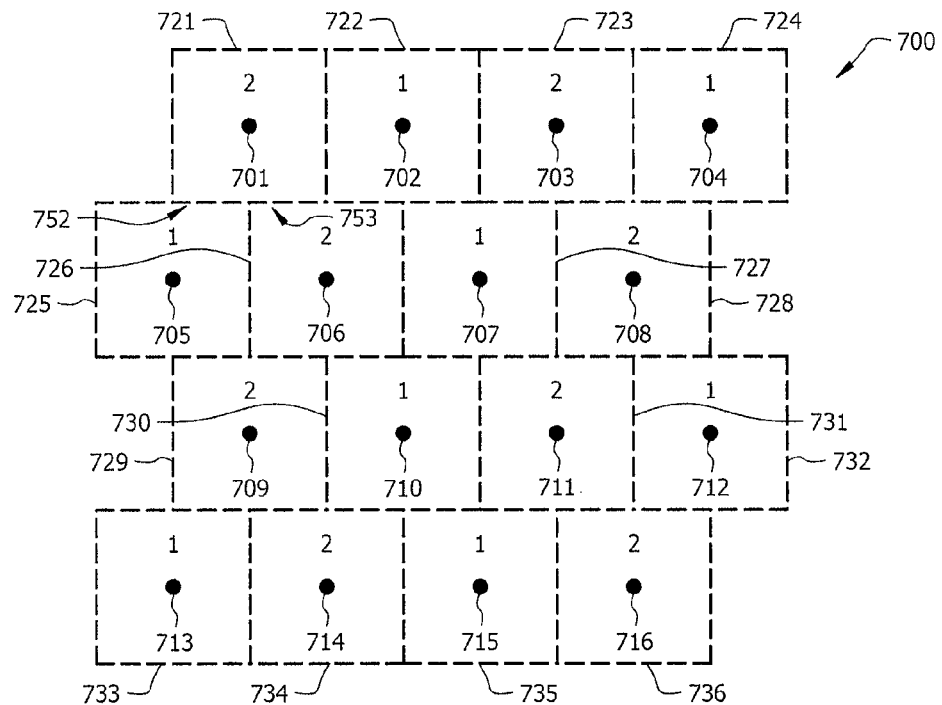
FIGS. 7A-7C are an illustration of a tier offset cell deployment geometry wireless backhaul network implementing heterogeneous wireless backhaul network expansion techniques in accordance with embodiments of the present invention.

In accordance with embodiments of the invention, a plurality of hubs are disposed in a predetermined cell deployment geometry to provide communication services within a composite service area. Cells, such as those of the exemplary embodiments of FIGS. 6A and 7A, may comprise one or more sectors that are deployed throughout a geographic area. In general, a hub is approximately located in a center location of a cell, depending on constraints due to geographic and physical environment conditions. Such a hub may include one or more sector hubs, each of which is dedicated to providing wireless backhaul to a corresponding sector of the cell. Each such sector is capable of supporting one or more remote nodes. The footprint for a cell, such as shown in FIGS. 6A and 7A, represents a geographic area over which the hub, or the sector hubs thereof, provides wireless communications for remote nodes served by the wireless backhaul network. FIG. 6A, for example, shows wireless backhaul network 600 including hubs 601-616 disposed in a square cell deployment (i.e., cell centers aligned in rows and columns) geometry to define respective cells 621-636, wherein cells 621-636 cooperate to provide communication services within the composite service area of wireless backhaul network 600. Similarly, FIG. 7A shows wireless backhaul network 700 including hubs 701-716 disposed in a tier offset cell deployment geometry (cells of different rows of cells are adjacent but center offset by half an edge) to define respective cells 721-736, wherein cells 721-736 cooperate to provide communication services within the composite service area of wireless backhaul network 700.

As can be seen in the exemplary embodiments of FIGS. 6A and 7A, the cells of the wireless backhaul networks implement alternating frequency assignments, as described herein. In particular, two frequency bands or channels (e.g., channels 1 and 2) are reused within the wireless backhaul network, wherein the two channels are alternated between adjacent cells in an effort to reduce interference problems. As will be better understood from the discussion which follows, cells of the present invention which are expanded to multi-sectored cells themselves implement an alternating frequency reuse pattern, where the two frequency bands or channels (e.g., channels 1 and 2) are reused within a single cell, such as to improve the spectral efficiency of the available bandwidth.

The alternating frequency assignments provide orthogonal frequency faces (i.e., adjacent cell edges, wherein the cells having the adjacent cell edges utilize different frequencies within those sectors) which mitigate mutual interference with respect to the adjacent cells. For example, the adjacent cell edges of cells 621 and 622 provide orthogonal frequency face 651 due to the omni-sector of cell 621 (providing one of the adjacent cell edges) having frequency 2 assigned thereto and the omni-sector of cell 622 (providing the other of the adjacent cell edges) having frequency 1 assigned thereto. Similarly, the adjacent cell edges of cells 621 and 625 provide orthogonal frequency face 652 due to the omni-sector of cell 621 (providing one of the adjacent cell edges) having frequency 2 assigned thereto and the omni-sector of cell 625 (providing the other of the adjacent cell edges) having frequency 1 assigned thereto. Accordingly, although the opposing omni-sectors of these cells present broadside views with respect to each other (i.e., the azimuthal direction of the sectors, here omni-directional, are aimed directly at each other), their assignment of orthogonal wireless communication frequencies mitigates their mutual interference.

As with the square cell deployment geometry of wireless backhaul network 600 shown in FIG. 6A, the tier offset cell deployment geometry of wireless backhaul network 700 shown in FIG. 7A provides orthogonal frequency faces which mitigate mutual interference with respect to adjacent cells. For example, the adjacent cell edges of cells 721 and 722 provide orthogonal frequency face 751 due to the omni-sector of cell 721 (providing one of the adjacent cell edges) having frequency 2 assigned thereto and the omni-sector of cell 722 (providing the other of the adjacent cell edges) having frequency 1 assigned thereto. Similarly, the adjacent cell edges of cells 721 and 725 provide orthogonal frequency face 752 due to the omni-sector of cell 721 (providing one of the adjacent cell edges) having frequency 2 assigned thereto and the omni-sector of cell 725 (providing the other of the adjacent cell edges) having frequency 1 assigned thereto.

However, in the tier offset cell deployment geometry of wireless backhaul network 700, opposing faces are present which do not have orthogonal frequencies associated therewith, and thus do not present an orthogonal frequency face. For example, the adjacent cell edges of cells 721 and 726 provide non-orthogonal frequency face 753 due to the omni-sector of cell 721 (providing one of the adjacent cell edges) having frequency 2 assigned thereto and the omni-sector of cell 726 (providing the other of the adjacent cell edges) also having frequency 2 assigned thereto. However, the tier offset configuration of these cells disposes their hubs apart from each other a distance greater than their cell radius, thereby mitigating at least to some extent their mutual interference. Moreover, as preferred embodiments herein implement remote nodes within the cells which use highly directional antennas, the remote nodes of such cells with opposing faces which do not have orthogonal frequencies associated therewith will not substantially interfere with the adjacent cell due to their being directed away from the adjacent cell. Accordingly, despite the presence of opposing faces which do not have orthogonal frequencies associated therewith, the tier offset cell deployment geometry provides satisfactory wireless communication operation in various instances and provides a cell geometry option that may be desirable in particular situations (e.g., where cell site locations for square cell or other deployment configurations are not available). Moreover, such a tier offset cell deployment geometry may facilitate particular wireless backhaul expansion growth paths (e.g., sector division and frequency assignments) which are desired over other cell geometries, such as the aforementioned square cell deployment geometry.

The omni-sector configurations of FIGS. 6A and 7A provide wireless communication coverage of the composite service areas of the respective wireless backhaul networks. However, as demand, usage patterns, and/or other conditions change, adequate wireless communication service may not be provided to the remote nodes disposed within the cells of the wireless backhaul networks. For example, a multiple access technique (e.g., time division multiple access (TDMA), code division multiple access (CDMA), orthogonal frequency division multiple access (OFDMA), etc.) implemented within the sectors may become overloaded, and thus fail to provide a desired quality of service, when a number of remote nodes within a particular sector increases beyond some threshold number. Accordingly, although initially deploying cells with an omni-sector configuration may provide a cost and/or resource effective deployment for providing wireless communication coverage of the wireless backhaul network service area, a need for expansion in the wireless backhaul network may be presented during the operational life of the network. Likewise, although cells having any number of sectors may initially provide satisfactory service, a need for expansion in the wireless backhaul network may be presented during the operational life of that particular configuration.

It should be appreciated that the need for expansion may not be homogeneous within the wireless backhaul network. For example, increased demand may be experienced within some portion of the wireless backhaul network (e.g., a more urban area) while demand remains flat within some other portion of the wireless backhaul network (e.g., a more rural area). Accordingly, frequency reuse patterns of embodiments herein are adapted to facilitate heterogeneous expansion in wireless backhaul networks (i.e., expansion in only a portion of the wireless backhaul network). In particular, the frequency reuse pattern of embodiments is adapted to accommodate heterogeneous expansion in the wireless backhaul network by dividing each cell of a selected cluster of cells to provide added sectors. Frequency assignments are made according to embodiments such that adjacent cells provide orthogonal frequency faces with respect to one another. Such orthogonal frequency faces comprise a cell edge of a cell associated with a frequency of the plurality of wireless communication frequencies which is adjacent to a cell edge of another cell associated with a different frequency of the plurality of wireless communication frequencies to thereby mitigate mutual interference. The frequency assignments are further made according to embodiments such that, where orthogonal frequency faces are not maintained between adjacent cell edges as sectors are added, non-broadside common frequency views are provided with respect to the particular opposing sectors for which orthogonal frequency faces are not provided. Such non-broadside common frequency views comprise the azimuthal direction of the opposing sectors being offset, such as by 20° or more, to thereby mitigate mutual interference. Accordingly, the foregoing frequency reuse patterns are adapted to accommodate heterogeneous expansion in the wireless backhaul network by dividing each cell of a selected cluster of cells to provide added sectors while mitigating interference by maintaining the orthogonal frequency face relationships and/or providing non-broadside common frequency views between opposing sectors of the wireless backhaul network.

Figure 6B:
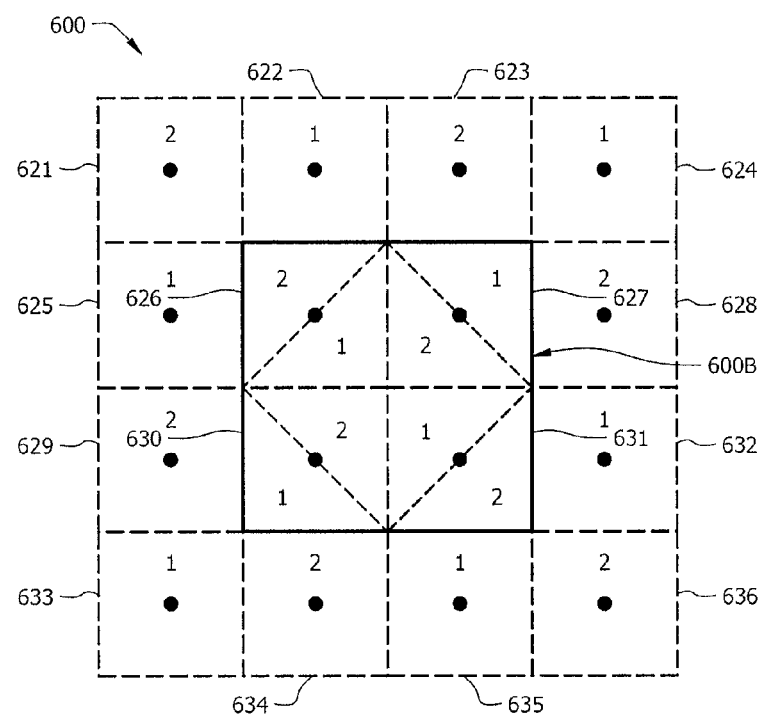
Figure 7B:
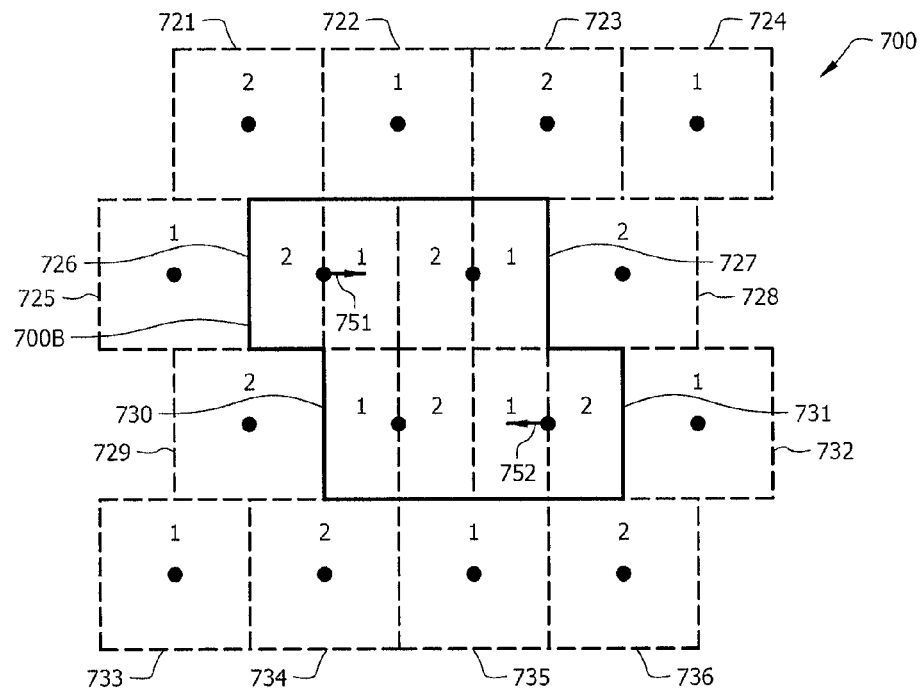

FIGS. 6B and 7B illustrate heterogeneous expansion in the wireless backhaul networks of FIGS. 6A and 7A, respectively, using frequency reuse patterns in accordance with the concepts of the present invention. In the embodiments illustrated in FIGS. 6B and 7B, a cluster of cells within the respective wireless backhaul network is selected for expansion by dividing each cell of a selected cluster of cells to provide added sectors. In particular, cells 626, 627, 630, and 631 were selected as a cluster of cells (shown as cluster 600B) for expansion in FIG. 6B. Similarly, in FIG. 7B cells 726, 727, 730, and 731 were selected as a cluster of cells (shown as cluster 700B) for expansion. In the embodiments of FIGS. 6B and 7B, the cluster cells (cells 626, 627, 630, and 631 of cluster 600B in FIG. 6B and cells 726, 727, 730, and 731 of cluster 700B in FIG. 7B) are expanded (as compared to their previous configuration shown in FIGS. 6A and 7A) by dividing each cell of a selected cluster of cells to provide added sectors (shown here as omni-sectored to bi-sectored expansion).

As can be seen in FIGS. 6B and 7B, the cells external to the selected cluster of cells selected for expansion (i.e., cells 621-624, 625, 628, 629, and 632-636 in FIG. 6B and cells 721-724, 725, 728, 729, and 732-736 in FIG. 7B) remain unexpanded. Thus, the expansion of the cluster cells within these exemplary wireless backhaul networks is heterogeneous.

Selection of the particular cells within a wireless backhaul network for expansion using heterogeneous wireless backhaul network expansion techniques of the present invention is preferably based upon a plurality of criteria. In accordance with embodiments of the invention, at least one cell of the cluster of cells is selected based upon a wireless backhaul network operational goal and at least one cell of the cluster of cells is selected based upon a heterogeneous expansion goal. For example, a wireless backhaul network operational goal may be to provide additional wireless communication capacity (e.g., to serve an increase in demand) within one or more selected cell of the wireless backhaul network through expanding the number of sectors and frequency assignments in the selected cell or cells. Correspondingly, a heterogeneous expansion goal may be to expand the number of sectors and frequency assignments of one or more cells adjacent to a cell or cells selected for service goal expansion in order to provide orthogonal frequency faces and/or non-broadside common frequency views with respect to the cluster cells and external cells after expansion. Accordingly, the configuration of cells comprising clusters 600B and 700B are selected according to embodiments based upon both network operational goals and heterogeneous expansion goals.

It should be appreciated that, although the embodiments of FIGS. 6B and 7B show clusters 600B and 700B comprising 4 cells, the concepts of the invention are not limited to clusters of 4 cells. For example, in wireless backhaul network 700, cell 726 may be selected for service goal expansion and cell 727 may be selected for expansion goal expansion (as will be better understood from the discussion which follows) to thereby define a cluster of cells for heterogeneous expansion wherein suitable interference mitigation is provided by maintaining the orthogonal frequency face relationships and/or providing non-broadside common frequency views between opposing sectors of the wireless backhaul network. The 4 cell cluster illustrated in FIG. 7B may, for example, be a result of cells 726 and 730 being selected for service goal expansion and cells 727 and 731 correspondingly being for expansion goal expansion. In contrast, due to the cell deployment geometry implemented in wireless backhaul network 600, cell 626 may be selected for service goal expansion and cells 627, 630, and 631 may be selected for expansion goal expansion to thereby define a cluster of cells for heterogeneous expansion wherein suitable interference mitigation is provided by maintaining the orthogonal frequency face relationships and/or providing non-broadside common frequency views between opposing sectors of the wireless backhaul network. From the foregoing it should be appreciated that various cluster configurations (i.e., the number cluster cells, the relative positions of the cluster cells, etc.) may be utilized according to embodiments of the invention, such as based upon cell deployment geometry, sector dividing techniques used, service goals, etc.

The cluster cells of FIGS. 6B and 7B, having been expanded to multi-sectored cells, are assigned wireless communication frequencies implementing an alternating frequency reuse pattern, where the two frequency bands or channels (e.g., channels 1 and 2) are reused within each such cell. For example, in wireless backhaul network 600, cell 626 is divided diagonally to provide a bi-sectored cell configuration for the aforementioned service goal expansion. Correspondingly, cells 627, 630, and 631 are divided diagonally to provide bi-sectored cell configurations for the aforementioned expansion goal expansion. The frequency assignments for the sectors of the expanded cells are made to maintain the orthogonal frequency faces around the periphery of cluster 600B. That is, the frequency assignments made in the embodiment illustrated in FIG. 6B maintain all orthogonal frequency faces with the external cells (i.e., cells 622, 623, 625, 628, 629, 632, 634, and 635) that were present prior to the dividing of the cluster cells into bi-sectored cells. Accordingly, the frequency reuse plan implemented with respect to the heterogeneous expansion in wireless backhaul network 600 of FIG. 6B mitigates interference by maintaining the orthogonal frequency face relationships between the cluster cells and the adjacent external cells.

In wireless backhaul network 700, cells 726 and 730 are divided perpendicular (divided vertically in the illustrated embodiment) to the to the row offset (horizontal offset in the illustrated embodiment) to provide a bi-sectored cell configuration for the aforementioned service goal expansion. Correspondingly, cells 727 and 731 are divided perpendicular to the row offset to provide the aforementioned expansion goal expansion. The frequency assignments for the sectors of the expanded cells are made to maintain the orthogonal frequency face relationships and/or provide non-broadside common frequency views between opposing sectors in wireless backhaul network 700. That is, the frequency assignments made with respect to the left most sectors of cells 726 and 730 and the right most sectors of cells 727 and 731 maintain the orthogonal frequency faces with adjacent external cells 725, 728, 729, and 732. Additionally, the frequency assignments made with respect to the right most sectors of cells 726 and 730 and the left most sectors of cells 727 and 731 provide both orthogonal frequency faces with respect to adjacent cluster cells and non-broadside common frequency views (i.e., the azimuthal direction of opposing sectors having the same frequency assignment are offset, as represented by sector beam directional vectors 751 and 752 not pointing directly at the hub of adjacent cells 722 and 735 using a common frequency) with respect to adjacent external cells 722 and 735. Accordingly, the frequency reuse plan implemented with respect to the heterogeneous expansion in wireless backhaul network 700 of FIG. 7B mitigates interference by maintaining the orthogonal frequency face relationships and by providing non-broadside common frequency views between opposing sectors in the wireless backhaul network.

It should be appreciated from the foregoing that the dividing of the cluster cells may be performed in various configurations for maintaining the orthogonal frequency face relationships and/or providing non-broadside common frequency views between opposing sectors in the wireless backhaul network. For example, a particular sector division configuration used to provide heterogeneous wireless backhaul network expansion according to embodiments herein may be selected depending upon cell deployment geometry, the number of existing sectors and the number of added sectors, the configurations of adjacent cell sectors, etc. Different sector division configurations (e.g., vertical, horizontal, diagonal, slant, etc.) may be utilized in various combinations within a cell, as illustrated by the exemplary embodiments discussed below.

Although the foregoing heterogeneous wireless backhaul network expansion examples illustrate frequency reuse patterns according to embodiments herein applied with respect to expansion from omni-sector cells to bi-sector cells, the concepts of the present invention are not limited to such sector configurations. For example, FIG. 7C shows heterogeneous expansion from bi-sector cells to quad-sector cells and FIG. 6C shows heterogeneous expansion from quad-sector cells to octo-sector cells, all using heterogeneous wireless backhaul network expansion techniques as described above.

Figure 7C:
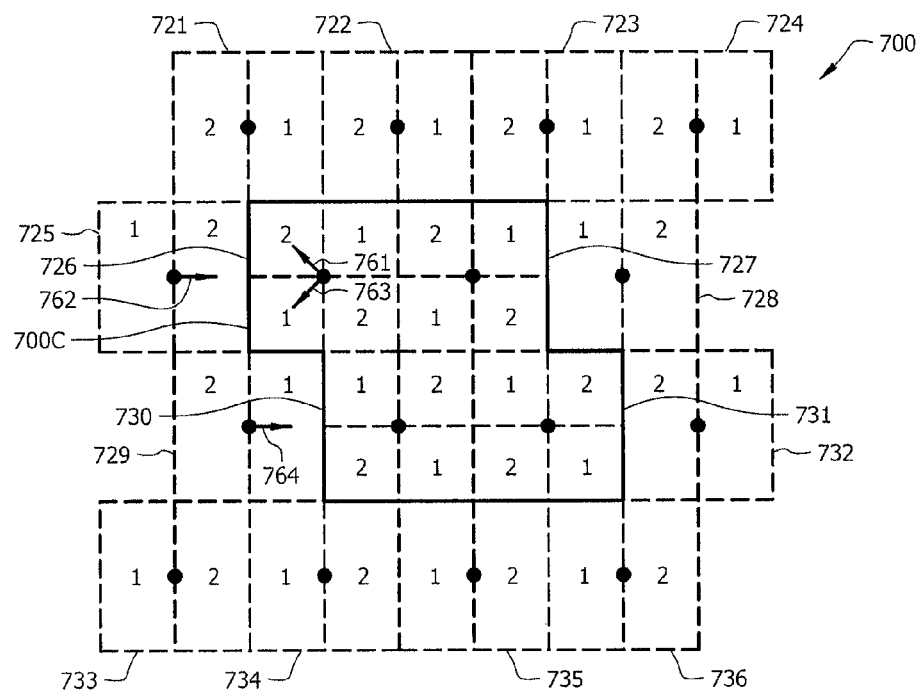

As with the embodiments discussed above, the frequency assignments for the sectors of the expanded cells in the bi-sector to quad-sector heterogeneous expansion of FIG. 7C are made to maintain the orthogonal frequency face relationships and/or provide non-broadside common frequency views between opposing sectors in wireless backhaul network 700. For example, the frequency assignments made with respect to the upper left most sector of cell 726 and the lower left most sector of cell 726 maintain the orthogonal frequency faces with adjacent external cells 721 and 725, respectively. Additionally, the frequency assignments made with respect to the upper left most sector of cell 772 and the lower left most sector of cell 726 provide non-broadside common frequency views (i.e., the azimuthal direction of opposing sectors having the same frequency assignment are offset, as represented by sector beam directional vectors 761 and 762 as well as 763 and 764 not pointing directly at one another) with respect to adjacent external cells 725 and 729, respectively. Accordingly, the frequency reuse plan implemented with respect to the heterogeneous expansion in wireless backhaul network 700 of FIG. 7C mitigates interference by maintaining the orthogonal frequency face relationships and by providing non-broadside common frequency views between opposing sectors in the wireless backhaul network according to the concepts herein.

Figure 6C:
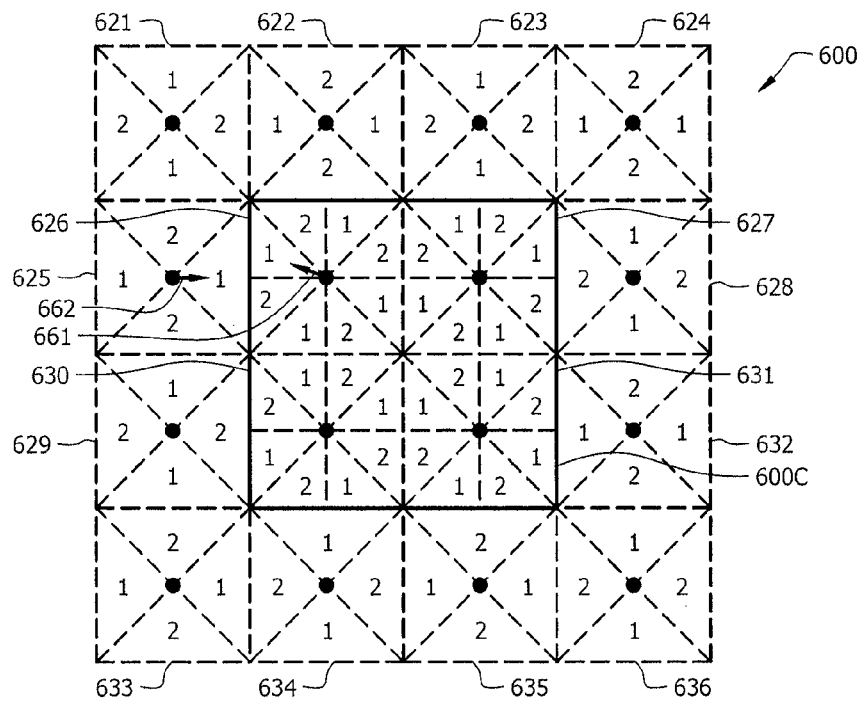

Similarly, the frequency assignments for the sectors of the expanded cells in the quad-sector to octo-sector heterogeneous expansion of FIG. 6C are made to maintain the orthogonal frequency face relationships and/or provide non-broadside common frequency views between opposing sectors in wireless backhaul network 600. For example, the frequency assignments made with respect to the lower left most sector of cell 626 in which frequency 2 is assigned maintains the orthogonal frequency face with adjacent external cell 625. Additionally, the frequency assignments made with respect to the upper left most sector of cell 626 in which frequency 1 is assigned provides non-broadside common frequency views (i.e., the azimuthal direction of opposing sectors having the same frequency assignment are offset, as represented by sector beam directional vectors 661 and 662 not pointing directly at one another) with respect to adjacent external cell 625. Accordingly, the frequency reuse plan implemented with respect to the heterogeneous expansion in wireless backhaul network 600 of FIG. 6C mitigates interference by maintaining the orthogonal frequency face relationships and by providing non-broadside common frequency views between opposing sectors in the wireless backhaul network according to the concepts herein.

It should be appreciated that the frequency assignments made in implementing heterogeneous wireless backhaul network expansion techniques according to embodiments may utilize various frequency reuse patterns to implement alternating frequency assignments as described herein. For example, alternating frequency reuse patterns, such as the aforementioned technique wherein a second tier includes a second cell configured to support a second alternating reuse pattern wherein the second alternating frequency reuse pattern includes a first alternating frequency reuse pattern rotated by ninety degrees, may be utilized when implementing heterogeneous wireless backhaul network expansion techniques according to embodiments of the invention.

Figure 8A:
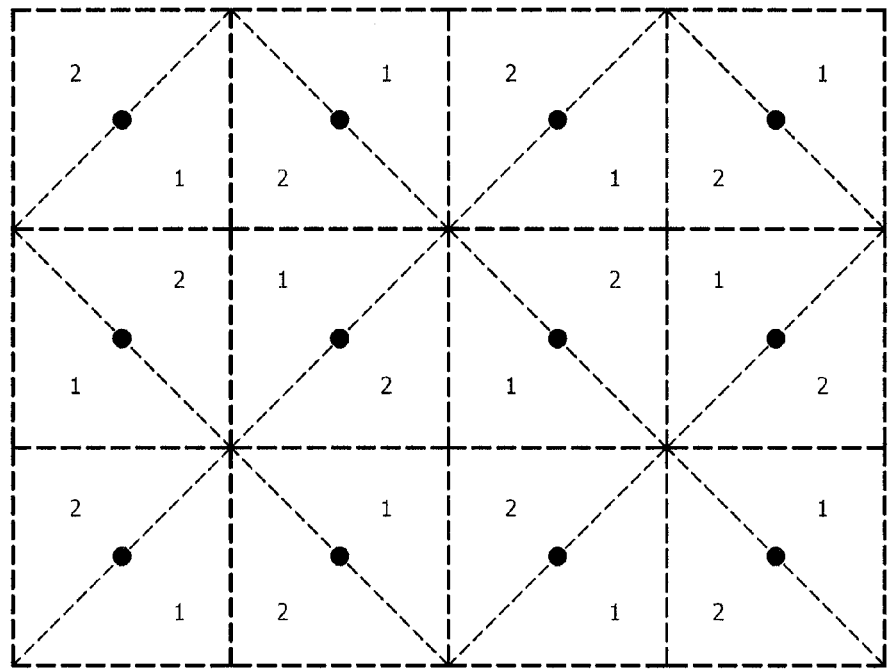
FIGS. 8A-8C are an illustration of a homogeneous build out of a square cell deployment geometry wireless backhaul network implementing heterogeneous wireless backhaul network expansion techniques in accordance with embodiments of the present invention.
Figure 8B:
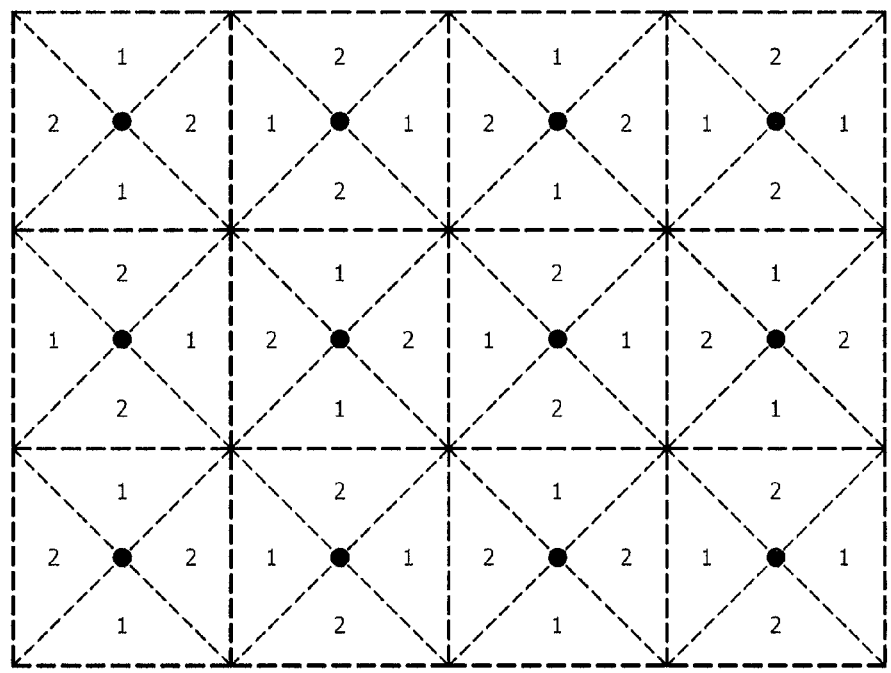
Figure 8C:
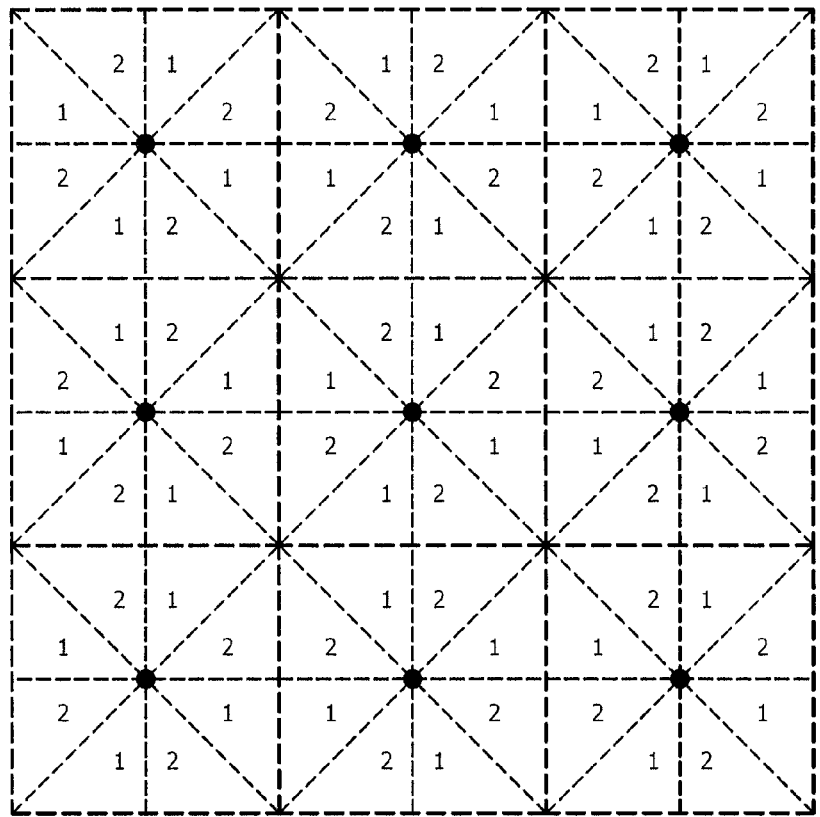
Figure 9A:
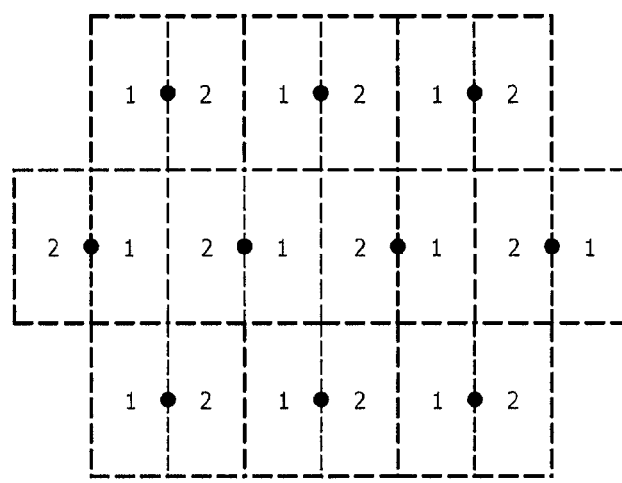
FIGS. 9A-9C are an illustration of a homogeneous build out of a tier offset cell deployment geometry wireless backhaul network implementing heterogeneous wireless backhaul network expansion techniques in accordance with embodiments of the present invention.
Figure 9B:
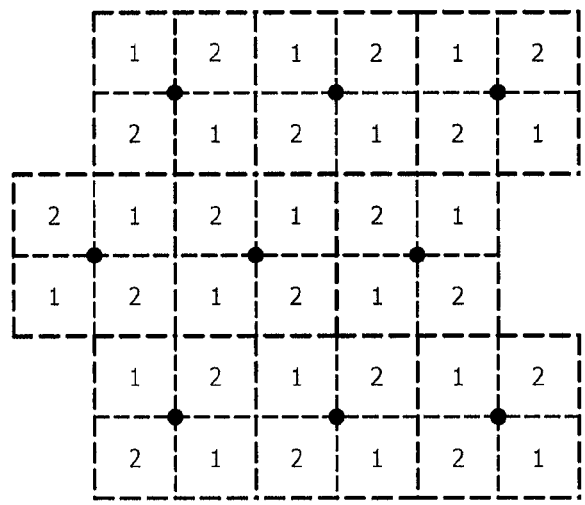
Figure 9C:
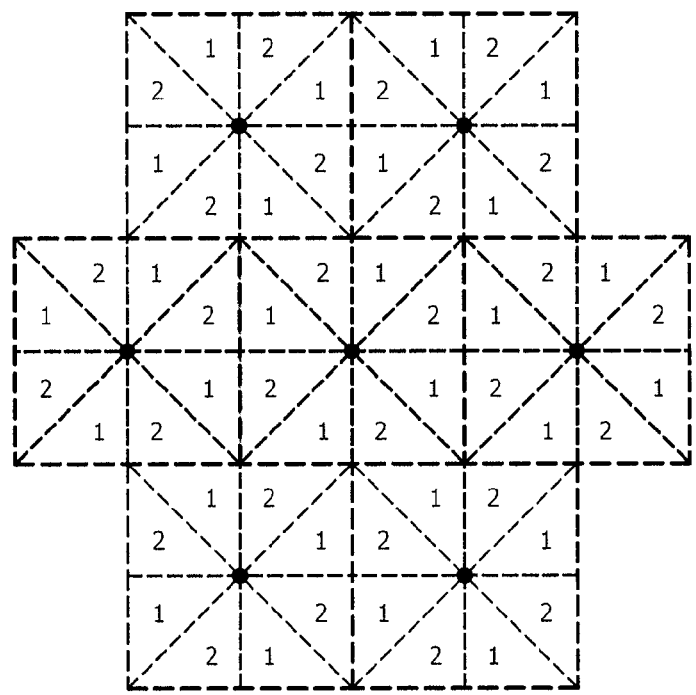

Although the foregoing exemplary embodiments described with respect to implementation of heterogeneous wireless backhaul network expansion techniques are illustrated in a heterogeneous state, these wireless backhaul networks may nevertheless use the heterogeneous wireless backhaul network expansion techniques to build out homogeneous networks as well as heterogeneous networks. Examples of homogeneous networks as may be built out using the foregoing heterogeneous wireless backhaul network expansion techniques are shown in FIGS. 8A-9C. Specifically, FIG. 8A (square cell deployment geometry) and 9A (tier offset cell deployment geometry) show wireless backhaul networks homogeneously built out to include bi-sector cells, FIGS. 8B and 9B show wireless backhaul networks homogeneously built out to include quad-sector cells, and FIGS. 8C and 9C show wireless backhaul networks homogeneously built out to include octo-sector cells. It should be appreciated that the frequency assignments implemented in the wireless backhaul network of FIG. 9C utilizes various frequency reuse patterns to implement the alternating frequency assignments. In particular, the aforementioned technique wherein the second tier includes a second cell configured to support a second alternating reuse pattern wherein the second alternating frequency reuse pattern includes the first alternating frequency reuse pattern rotated by ninety degrees is implemented.

Figure 10:
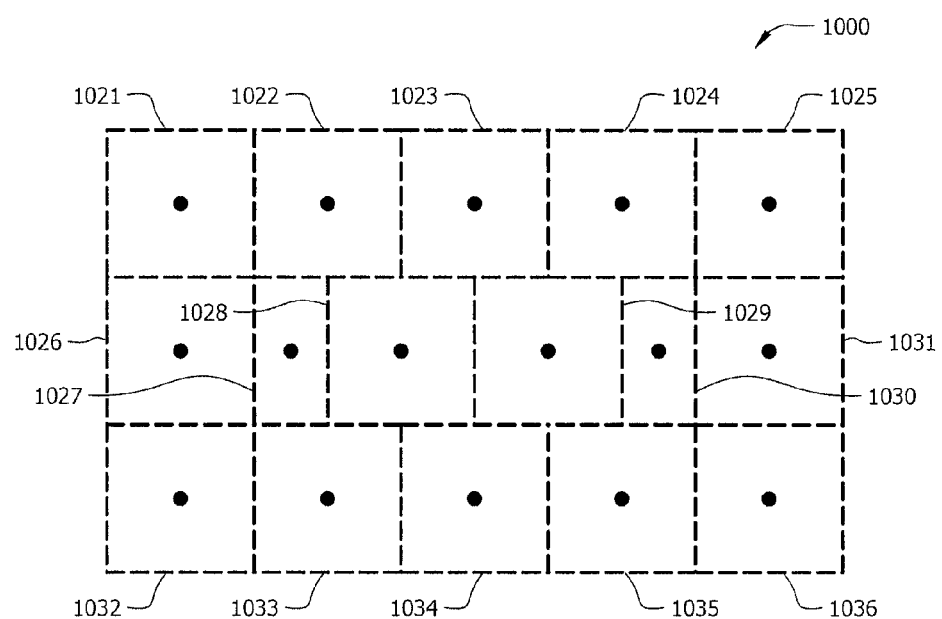
FIG. 10 is an illustration of a heterogeneous cell deployment geometry wireless backhaul network in accordance with embodiments of the present invention.

It should be appreciated that wireless backhaul networks implementing concepts of the present invention are not limited to the network configurations illustrated in the exemplary embodiments. For example, wireless backhaul networks in accordance with embodiments herein may comprise any number of cells deployed within any size and shape of geographic region, and thus are not limited to the relatively small, square configurations illustrated herein. Moreover, hubs (or sector hubs) of one or more cells of any cell deployment geometry need not be deployed where no remote node is present, thereby leaving one or more wireless communication gaps within the service area of the wireless backhaul network. Likewise, cell deployment geometries other than those of the foregoing exemplary embodiments may implement heterogeneous wireless backhaul network expansion techniques of the present invention. For example, a tier offset cell deployment geometry may implement an offset with respect to cells of different columns rather than the row offset configuration illustrated in FIG. 7A. Moreover, cell deployment geometries may be combined, such as to dispose some cells of a first cell deployment geometry within a wireless backhaul network having cells of a second cell deployment geometry, to thereby provide a heterogeneous cell deployment geometry. Wireless backhaul network 1000 of FIG. 10, for example, shows a tier offset cell deployment geometry of cells (cells 1027-1033) disposed within cells of a square cell deployment geometry of cells (cells 1021-1026 and 1031-1036), wherein cells 1027 and 1030 provide a reduced cell footprint to accommodate the tier offset cell deployment geometry being disposed within the square cell deployment geometry.

Although embodiments have been described herein with reference to the alternating assignment of frequencies 1 and 2, it should be appreciated that the actual wireless communication channels need not be similarly configured with respect to another instance of that frequency or any instance of the other frequency. For example, frequency 1 as utilized by various sectors of a wireless backhaul network may comprise wireless communication channels of different bandwidths (e.g., 5 MHz, 7 MHz, 10 MHz, etc.) as appropriate to the demand within the particular sector. Moreover, wireless communication channels designated as a particular frequency reference (e.g., frequency 1 and frequency 2) in embodiments herein need not actually utilize a same frequency band as another wireless communication channel designated as that frequency reference. That is, communication channels of different sectors designated as frequency 1 according to embodiments herein may each comprise a different frequency band, as long as those frequency bands are non-overlapping with respect to the frequency bands utilized by sectors designated as frequency 2. Moreover, the sectors of embodiments herein are not limited to the use of a single wireless communication channel. For example, a second frequency reuse pattern herein may be overlaid, or partially overlaid, over a first frequency reuse pattern for assigning additional wireless communication frequencies to sectors in a manner adapted to accommodate expansion in the wireless backhaul network.

A system and method for frequency reuse in a multi-cell deployment model of wireless backhaul network, is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The one or more present inventions, in various embodiments, include components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for facilitating heterogeneous expansion of a wireless backhaul network including a plurality of cells providing wireless backhaul communication implementing a first wireless frequency reuse pattern providing a first alternating utilization of a plurality of wireless communication frequencies by the cells of the backhaul network, the method comprising:

identifying, by a device associated with the wireless backhaul network, a cell cluster including a plurality of backhaul network cells (cluster cells) for heterogeneous expansion within the wireless backhaul network, wherein each cluster cell provides an orthogonal frequency face to a cell of the wireless backhaul network external to the cell cluster (external cell);

dividing, by the device, each cluster cell into a plurality of sectors greater than a number of sectors provided in each cluster cell prior to the dividing; and assigning, by the device, frequencies of the plurality of wireless communication frequencies to sectors of the cluster cells added by the dividing according to a second wireless frequency reuse pattern, wherein the second wireless frequency reuse pattern provides a second alternating utilization of the plurality of wireless communication frequencies within each cluster cell, wherein, after the dividing, the sectors of the cluster cells added by the dividing having a cell edge adjacent to an external cell provide an orthogonal frequency face relationship with the adjacent external cell or are provided a non-broadside common frequency view with respect to the external cell by the frequency assignments, wherein cells of the wireless backhaul network external to the cell cluster continue to provide wireless backhaul communication implementing the first wireless frequency reuse pattern that provides the first alternating utilization of the plurality of wireless communication frequencies, and wherein the first alternating utilization of the plurality of wireless communication frequencies and the second alternating utilization of the plurality of wireless communication frequencies are different.

2. The method of claim 1, wherein the orthogonal frequency face relationship between a portion of each cluster cell remaining after the dividing and an adjacent one of the external cells is maintained after the dividing.

3. The method of claim 1, wherein the orthogonal frequency faces comprise a cell edge of a cell associated with a frequency of the plurality of wireless communication frequencies which is adjacent to a cell edge of another cell associated with a different frequency of the plurality of wireless communication frequencies.

4. The method of claim 1, wherein the identifying the cell cluster comprises:
   identifying, among the plurality of cells included in the wireless backhaul network, at least one cell for service goal expansion; and
   identifying, among the plurality of cells included in the wireless backhaul network, one or more cells adjacent to the at least one service goal expansion cell for expansion goal expansion.

5. The method of claim 4, wherein the service goal expansion comprises expansion of the cell for meeting a wireless backhaul network operational goal, and wherein the expansion goal expansion comprises expansion of the cell for meeting a heterogeneous expansion goal.

6. The method of claim 5, wherein the wireless backhaul network operational goal comprises added bandwidth for serving increased demand within the at least one service goal expansion cell, and wherein the heterogeneous expansion goal comprises facilitating providing the sectors of the cluster cells added by the dividing having a cell edge adjacent to an external cell with an orthogonal frequency face relationship with the adjacent external cell or a non-broadside common frequency view with respect to the external cell by the frequency assignments.

7. The method of claim 4, wherein the wireless backhaul network comprises a square cell deployment geometry configuration, and wherein the cell cluster comprises 4 cells within the square cell deployment geometry having a first cluster cell and a third cluster cell utilizing a first frequency of the plurality of wireless communication frequencies and a second cluster cell and a fourth cluster cell utilizing a second frequency of the plurality of wireless communication frequencies, and wherein the first and third cluster cells are disposed in the square configuration diagonally with respect to each other and the second and fourth cluster cells are disposed in the square configuration diagonally with respect to each other.

8. The method of claim 7, wherein the dividing each cluster cell into a plurality of sectors comprises:
   dividing each of the cluster cells diagonally.

9. The method of claim 4, wherein the wireless backhaul network comprises a tier offset cell deployment geometry configuration, and wherein a cell cluster comprises 2 cells within the tier offset cell deployment geometry having a first cluster cell and a second cluster cell in a first row, wherein the first row is offset with respect to an adjacent row of cells within the tier offset cell deployment geometry, and wherein the first cluster cell utilizes a first frequency of the plurality of wireless communication frequencies and the second cluster cell utilizes a second frequency of the plurality of wireless communication frequencies.

10. The method of claim 9, wherein the cells of the wireless backhaul network provide square cellular coverage patterns, and wherein the offset of the cells of the first row is an offset of one half a length of a cell edge of the square cellular coverage patterns.

11. The method of claim 9, wherein the dividing each cluster cell into a plurality of sectors comprises:
   dividing the cluster cells along a line perpendicular to the row offset.

12. A method for facilitating heterogeneous expansion of a wireless backhaul network including a plurality of cells providing wireless backhaul communication implementing a first wireless frequency reuse pattern providing a first alternating utilization of a plurality of wireless communication frequencies by the cells of the backhaul network, the method comprising:
   identifying by a device associated with the wireless backhaul network, a cell cluster including a plurality of backhaul network cells (cluster cells) for heterogeneous expansion, wherein the cluster cells are identified by:
      identifying, among the plurality of cells included in the wireless backhaul network, at least one cell for service goal expansion; and
      identifying, among the plurality of cells included in the wireless backhaul network, one or more cells adjacent to the at least one service goal expansion cell for expansion goal expansion;
   dividing each cluster cell into a plurality of sectors greater than a number of sectors provided in each cluster cell prior to the dividing; and
   assigning frequencies of the plurality of wireless communication frequencies to sectors of the cluster cells added by the dividing according to a second wireless frequency reuse pattern, wherein the second wireless frequency reuse pattern provides a second alternating utilization of the plurality of wireless communication frequencies within each cluster cell, wherein, after the dividing, the sectors of the cluster cells that have a cell edge adjacent to an external cell provide an orthogonal frequency face relationship with the adjacent external cell or provide a non-broadside common frequency view with respect to the external cell by the frequency assignments, wherein cells of the backhaul network external to the cell cluster continue to provide wireless backhaul communication implementing the first wireless frequency reuse pattern that provides the first alternating utilization of the plurality of wireless communication frequencies, and wherein the first alternating utilization of the plurality of wireless communication frequencies and the second alternating utilization of the plurality of wireless communication frequencies are different.

13. The method of claim 12, wherein the service goal expansion comprises expansion of the cell for meeting a wireless backhaul network operational goal, and wherein the expansion goal expansion comprises expansion of the cell for meeting a heterogeneous expansion goal.

14. The method of claim 13, wherein the wireless backhaul network operational goal comprises added bandwidth for serving increased demand within the at least one service goal expansion cell, and wherein the heterogeneous expansion goal comprises facilitating providing the sectors of the cluster cells added by the dividing having a cell edge adjacent to an external cell with an orthogonal frequency face relationship with the adjacent external cell or a non-broadside common frequency view with respect to the external cell by the frequency assignments.

15. The method of claim 12, wherein the wireless backhaul network comprises a square cell deployment geometry configuration, and wherein the cell cluster comprises 4 cells within the square cell deployment geometry.

16. The method of claim 12, wherein the wireless backhaul network comprises a tier offset cell deployment geometry configuration, and wherein a cell cluster comprises 2 cells within the tier offset cell deployment geometry.

17. The method of claim 16, wherein the cells of the wireless backhaul network provide square cellular coverage patterns, and wherein the offset is an offset of one half a length of a cell edge of the square cellular coverage patterns.

18. The method of claim 12, wherein an orthogonal frequency face relationship between a portion of each cluster cell remaining after the dividing and an adjacent external cell is maintained after the dividing.

19. The method of claim 12, wherein each cluster cell provides an orthogonal frequency face to a plurality of adjacent external cells, and wherein the orthogonal frequency face relationship between each cluster cell and corresponding plurality of external cells is maintained after the dividing.

20. The method of claim 12, wherein the plurality of sectors the cluster cells are divided into comprises at least twice the number of sectors provided in each cluster cell prior to the dividing.

21. A wireless backhaul network, comprising:
   a plurality of cells supporting wireless backhaul communication within a corresponding cell footprint portion of the wireless backhaul network;
   a cluster of cells within the plurality of cells that has been divided into a number of sectors greater than a number of sectors of adjacent cells of the wireless backhaul network external to the cluster to thereby provide a heterogeneous cell configuration within the wireless backhaul network; and
   a frequency reuse plan providing alternating assignments of a plurality of frequencies to the plurality of cells so as to facilitate the heterogeneous cell configuration by providing a first alternating assignment of the plurality of frequencies with respect to the sectors of the cluster cells to provide all cell edges adjacent to an external cell with either an orthogonal frequency face relationship with the adjacent external cell or a non-broadside common frequency view with respect to the adjacent external cell and by providing a second alternating assignment of the plurality of frequencies with respect to the external cells to provide cell edges between adjacent external cells with an orthogonal frequency face relationship or a non-broadside common frequency view.

22. The wireless backhaul network of claim 21, wherein the plurality of cells are disposed in a square cell deployment geometry.

23. The wireless backhaul network of claim 21, wherein the plurality of cells are disposed in a tier offset cell deployment geometry.

24. The wireless backhaul network of claim 23, wherein the cells supporting wireless backhaul communication provide square cellular coverage patterns, and wherein the offset is an offset of one half a length of a cell edge of the square cellular coverage patterns.

25. The wireless backhaul network of claim 21, wherein the number of sectors of the cluster cells is at least twice the number of sectors of the adjacent cells external to the cluster.

26. The wireless backhaul network of claim 25, wherein the number of sectors of the cluster cells is 2 and the number of sectors of the adjacent cells external to the cluster is 1.

27. The wireless backhaul network of claim 25, wherein the number of sectors of the cluster cells is 4 and the number of sectors of the adjacent cells external to the cluster is 2.

28. The wireless backhaul network of claim 25, wherein the number of sectors of the cluster cells is 8 and the number of sectors of the adjacent cells external to the cluster is 4.

* * * * *